(12) United States Patent
Yang et al.

(10) Patent No.: US 11,394,033 B2
(45) Date of Patent: Jul. 19, 2022

(54) APPARATUS COMPRISING MANGANESE-COBALT SPINEL OXIDE/CARBON CATALYST

(71) Applicants: Cornell University, Ithaca, NY (US); Wuhan University, Wuhan (CN)

(72) Inventors: Yao Yang, Ithaca, NY (US); Héctor D. Abruña, Ithaca, NY (US); Lin Zhuang, Wuhan (CN); Hanging Peng, Wuhan (CN); Li Xiao, Wuhan (CN)

(73) Assignees: CORNELL UNIVERSITY, Ithaca, NY (US); WUHAN UNIVERSITY, Wuhan (CN)

( * ) Notice: Subject to any disclaimer, the term of this patent is extended or adjusted under 35 U.S.C. 154(b) by 292 days.

(21) Appl. No.: 16/819,349

(22) Filed: Mar. 16, 2020

(65) Prior Publication Data

US 2020/0295380 A1    Sep. 17, 2020

Related U.S. Application Data

(60) Provisional application No. 62/818,843, filed on Mar. 15, 2019.

(51) Int. Cl.
*H01M 8/1004*    (2016.01)
*H01M 4/90*    (2006.01)
(Continued)

(52) U.S. Cl.
CPC ....... *H01M 4/9033* (2013.01); *H01M 4/9083* (2013.01); *H01M 8/1004* (2013.01); *H01M 8/1007* (2016.02); *H01M 8/1009* (2013.01); *H01M 8/1011* (2013.01); *H01M 2004/8689* (2013.01)

(58) Field of Classification Search
None
See application file for complete search history.

(56) References Cited

U.S. PATENT DOCUMENTS 9,237,658 B2    1/2016    Dai et al.
2004/0247988 A1*    12/2004    Ovshinsky .......... H01M 4/8605
502/154

(Continued)

OTHER PUBLICATIONS

Menezes, Prashanth, W. et al., "Cobalt-Manganese-Based Spinels as Multifunctional Materials that unify Catalytic Water Oxidation and Oxygen Reduction Reactions," ChemSusChem, vol. 8, 2015, pp. 164-171.

(Continued)

*Primary Examiner* — Jeremiah R Smith
(74) *Attorney, Agent, or Firm* — Heslin Rothenberg Farley & Mesiti P.C.

(57) ABSTRACT

Provided is an apparatus containing, as a cathode catalyst, a metal oxide/carbon catalyst composition. The metal oxide/carbon catalyst composition includes 40 to 95 wt % porous Mn—Co spinel oxide nanoparticles of the formula $Mn_xCo_{3-x}O_4$. The nanoparticles have an octahedral morphology, an average particle size of 5-100 nm, and average pore sizes of 1-5 nm (where x is the atomic fraction of manganese and 3-x is the atomic fraction of cobalt). The metal oxide nanoparticles are supported on a carbon substrate that contains at least 96 atomic % carbon.

20 Claims, 20 Drawing Sheets

(51) Int. Cl.
    *H01M 4/86*     (2006.01)
    *H01M 8/1007*     (2016.01)
    *H01M 8/1009*     (2016.01)
    *H01M 8/1011*     (2016.01)

(56) References Cited

U.S. PATENT DOCUMENTS

| | | | | |
|---|---|---|---|---|
| 2006/0263288 | A1* | 11/2006 | Pak | H01M 4/96 |
| | | | | 429/492 |
| 2009/0130502 | A1* | 5/2009 | Liu | H01M 4/923 |
| | | | | 429/483 |
| 2017/0098843 | A1* | 4/2017 | Manthiram | H01M 4/9016 |
| 2018/0248202 | A1* | 8/2018 | Khurana | H01M 4/0471 |

OTHER PUBLICATIONS

Nissinen, Terhi et al., "Microwave Synthesis of Catalyst Spinel $MnCo_2O_4$ for Alkaline Fuel Cell," Journal of Power Sources, vol. 106, 2002, pp. 109-115.

Liang, Yongye et al., "Covalent Hybrid of Spinel Manganese-Cobalt Oxide and Graphene as Advanced Oxygen Reduction Electrocatalysts," Journal of the American Chemical Society, vol. 134, Feb. 2010, pp. 3517-3523.

Ge, Xiaoming et al., "Dual-Phase Spinel $MnCo_2O_4$ and Spinel $MnCo_2O_4$/Nanocarbon Hybrids for Electrocatalytic Oxygen Reduction and Evolution," ACS Applied Materials & Interfaces, vol. 6, 2014, pp. 12684-12691.

Davydova, Elena S. et al., "Electrocatalysts for Hydrogen Oxidation Reaction in Alkaline Electrolytes," ACS Catalysis, 2018, 8, 7, pp. 6665-6690.

Yin, X. et al., "Effects of MEA Fabrication and Ionoer Composition on Fuel Cell Performance of PGM-Free ORR Catalyst," ECS Transactions (Online), vol. 77, Issue 11, 2018, pp. 1-10.

Restovic, A. et al., "Oxygen Reduction in Alkaline Medium at Thin $MgCo_{3-x}O_4$ (O < x < 1) Spinel Films Prepared by Spray Pyrolysis. Effect of Oxide Cation Composition on the Reaction Kinetics," Journal of Electroanalytical Chemistry, 522, 2002, pp. 141-151.

Liu, Huanying et al., "Single Crystal $(Mn,Co)_3O_4$ Octahedra for Highly Efficient Oxygen Reduction Reactions," Electrochimica Acta 144, 2014, pp. 31-41.

Si, Fengzhan et al., "Sequential Hydrothermal Synthesized Co—Mn-oxide/C Electrocatalysts for Oxygen Reduction in Alkaline Media," International Journal of Hydrogen Energy, vol. 44, 2019, pp. 21673-21682.

Yan, Xuecheng et al., "Defective-Activated-Carbon-Supported Mn—Co Nanoparticles as a Highly Efficient Electro catalyst for Oxygen Reduction," Advanced Materials, vol. 28, Issue 39, Oct. 19, 2016, pp. 8771-8778.

Kim, Jae-Kwang et al., "Rechargeable Seawater Battery and its Electrochemical Mechanism," Chemelectrochem Communications, vol. 2, 2015, pp. 328-332.

Wang, Ying et al., "Carbon Supported $MnO_x$—$Co_3O_4$ as Cathode Catalyst for Oxygen Reduction Reaction in Alkaline Media," International Journal of Hydrogen Energy 38, 2013, pp. 13611-13616.

Du, Guojun et al., "$Co_3O_4$ Nanoparticle-Modified $MnO_2$ nanotube bifunctional oxygen cathode catalysts for rechargeable zinc-air batteries," The Royal Society of Chemistry 2013, Nanoscale, vol. 5, pp. 4657-4661.

Ma, Tian Yi et al., "Mesoporous $MnCo_2O_4$ with abundant Oxygen Vacancy Defects as High-performance Oxygen Reduction Catalysts," Journal of Materials Chemistry A, 2014, vol. 2., pp. 8676-8682.

Jiang, Rongzhong et al., "Non-precious $Mn_{1.5}Co_{1.5}O_4$—$FeN_x$/C Nanocomposite as a Synergistic Catalyst for Oxygen Reduction in Alkaline Media," RSC Adv., 2016, vol. 6., pp. 69167-69176.

Wang, Hailiang et al., "Rechargable Li—$O_2$ Batteries with a Covalently Coupled $MnCo_2O_4$-graphene Hybrid as an Oxygen Cathode Catalyst," Energy and Environmental Science, 2012, vol. 5, pp. 7931-7935.

Li, Chun et al., "Phase and Composition Controllable Synthesis of Cobalt Manganese Spinel Nanoparticles Towards Efficient Oxygen Electrocatalysis," Nature Communications, 2015, pp. 1-8.

Wang, Ying et al., "Synergistic Mn—Co Catalyst Outperforms Pt on High-Rate Oxygen Reduction for Alkaline Polymer Electrolyte Fuel Cells," Nature Communications, 2019, pp. 1-8.

Yang, Yao et al., "High-Loading Composition-Tolerant Co—Mn Spinel Oxides with Performance Beyond 1 W/cm$^2$ in Alkaline Polymer Electrolyte Fuel Cells," American Chemical Society, ACE Energy Letters, Aug. 24, 2018, pp. A-G (1-7).

* cited by examiner

APPARATUS COMPRISING MANGANESE-COBALT SPINEL OXIDE/CARBON CATALYST

CROSS-REFERENCE TO RELATED APPLICATIONS

This application claims priority to U.S. Provisional Patent Application No. 62/818,843, filed Mar. 15, 2019, the disclosure of which is hereby incorporated by reference herein in its entirety.

GOVERNMENT LICENSE RIGHTS

This invention was made with government support under DMR-1719875 awarded by the National Science Foundation Materials Research Science and Engineering Center (NSF MRSEC). The United States Government has certain rights in the invention.

FIELD OF THE INVENTION

This invention relates to, inter alia, a metal oxide/carbon catalyst comprising porous Mn—Co spinel oxide nanoparticles of the formula $Mn_xCo_{3-x}O_4$, and to apparatuses and processes employing the same.

BACKGROUND

Hydrogen fuel cells have been recognized as a critical renewable energy technology, including, e.g., for powering electric vehicles (EVs). Despite the tremendous effort in lowering platinum (Pt) loading in the cathode of proton-exchange membrane fuel cells (PEMFCs), a significant amount of Pt (>0.2 $g_{Pt}$/kW) is still necessary to provide a power density of >1 $W/cm^2$ at ≥0.65 V and the catalyst cost accounts for more than one-third of a PEMFC stack cost. Alternatively, alkaline polymer electrolyte fuel cells (APEFCs) or anion-exchange membrane fuel cells (AEMFCs), in principle, enable the use non-precious metals or metal oxides as stable ORR electrocatalysts. A variety of candidates have been reported to show promising ORR activity in alkaline media from rotating disk electrode (RDE) tests, such as precious metal-based alloys, N-doped carbons, and 3d transition metal oxides. However, only few have demonstrated encouraging membrane electrode assembly (MEA) performance in alkaline media. Thus, in order to enable improved electrochemical devices (e.g., AEMFC's and MEA's), alternative new catalysts with favorable MEA performance must be developed.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

Briefly, the present invention satisfies the need for improved apparatuses, such as AEMFC's and membrane electrode assemblies (MEA's), and for materials to improve and better enable, inter alia, AEMFC's and MEA's.

The invention provides, inter alia, a metal oxide ($Mn_xCo_{3-x}O_4$)/carbon catalyst composition and related apparatuses and processes. The catalysts find use as, e.g., catalysts for ORR (for example, in MEA's, AEMFC's, electrolyzers, etc.).

Embodiments of the invention may address one or more of the problems and deficiencies discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

Certain embodiments of the presently-disclosed metal oxide/carbon catalysts and related apparatuses and processes/methods have several features, no single one of which is solely responsible for their desirable attributes. Without limiting the scope of the catalytically active particles and related compositions, devices and processes as defined by the claims that follow, their more prominent features will now be discussed briefly. After considering this discussion, and particularly after reading the section of this specification entitled "Detailed Description of the Invention," one will understand how the features of the various embodiments disclosed herein provide a number of advantages over the current state of the art. These advantages may include, without limitation, providing materials and compositions that have enhanced electrocatalytic activity toward ORR, providing apparatuses having improved ORR kinetics, providing low or lower cost catalysts (e.g., as compared to, e.g., commercial catalysts such at Pt catalysts), providing improved fuel cells (e.g., providing improved AEMFC's), providing improved MEA's, providing improved cathode catalysts for alkaline-based applications, etc.

In a first aspect, the invention provides a metal oxide/carbon catalyst composition comprising:
- 40 to 95 wt % metal oxide, said metal oxide being porous Mn—Co spinel oxide nanoparticles of the formula $Mn_xCo_{3-x}O_4$, said nanoparticles having an octahedral morphology, an average particle size of 5-100 nm, and average pore sizes of 1-5 nm, and wherein x is the atomic fraction of manganese (Mn), 3-x is the atomic fraction of cobalt (Co), and 0<x<3; and
- a carbon substrate comprising at least 96 atomic % carbon, wherein the metal oxide nanoparticles are supported on the carbon substrate.

In a second aspect, the invention provides an apparatus comprising an anode, a cathode, and a charge-passing material between the anode and the cathode, wherein the cathode comprises a metal oxide/carbon catalyst composition according to the first aspect of the invention.

In a third aspect, the invention provides an electrocatalytic process, wherein said process comprises use of the metal oxide/carbon catalyst according to the first aspect of the invention.

These and other objects, features, and advantages of this invention will become apparent from the following detailed description of the various aspects of the invention taken in conjunction with the accompanying drawings.

BRIEF DESCRIPTION OF THE DRAWINGS

The present invention will hereinafter be described in conjunction with the following drawing figures. The depicted figures serve to illustrate various embodiments of the invention. However, the invention is not limited to the precise arrangements and instrumentalities of the embodiments in the drawings.

FIG. 3a depicts a HAADF-STEM image of $MnCo_2O_4$ with 40 wt. % metal oxide loading on HSC KB. FIG. 3b depicts a particle size distribution (PSD) histogram of $MnCo_2O_4$ nanoparticles. FIG. 3c depicts an atomic-scale STEM image of one $MnCo_2O_4$ particle with (220) lattice d-spacings (2.9 Å). FIG. 3d depicts a pore size distribution of $MnCo_2O_4$ without carbon support, derived from the $N_2$ adsorption-desorption isotherm in the inset. Dashed lines indicate the existence of micropores (1.9 nm) and small mesopores (4.0 nm) in the porous $MnCo_2O_4$ NPs.

FIGS. 4a-b provide an overall view of STEM images of $CoMn_2O_4$/C. FIG. 4c depicts a STEM image of one nanoparticle with octahedral morphology. FIG. 4d depicts a particle size distribution histogram of $CoMn_2O_4$/C with an average particle size of 22 nm.

FIG. 11a shows rotating disk electrode (RDE) measurements in $O_2$-saturated KOH solution (1 mol/L) using 40 wt % Pt/C (Johnson Matthey, 50 $μg_{Pt}$/cm²) and 40 wt % MCS/C (72 $μg_{metal}$/cm²), respectively. Inset: Tafel plots. Scan rate=5 mV/s. Rotation rate=1600 rpm. See FIGS. S1-S2 for relevant electrochemical data. FIGS. 11b-c show the results of alkaline polymer electrolyte fuel cell (APEFC) tests with $H_2$ and $O_2$ at different relative humidities (RH). Anode catalyst: 60 wt % Pt—Ru/C (Johnson Matthey, 0.4 $mg_{metal}$/cm²). Cathode catalyst: 60 wt % Pt/C (Johnson Matthey, 0.4 $mg_{Pt}$/cm²) or 40 wt % MCS/C with an optimized loading of 0.58 $mg_{metal}$/cm². (See FIG. S3 for results with different catalyst loading.) Alkaline polymer electrolyte: aQAPS-$S_8$ membrane (35 μm in thickness) and aQAPS-$S_{14}$ ionomer (20 wt % in electrode)[4]. See FIGS. S4-S5 for impedance measurements and iR-corrected plots. Operation temperature=60° C. Backpressure=0.1 MPa. FIG. 11d shows a performance comparison: Kinetic current densities ($j_k$) at 0.85 V, calculated from the RDE data recorded in 1 mol/L NaOH/$H_2O$ and 1 mol/L NaOD/$D_2O$ (See FIG. S6 for relevant results of isotopic labelling experiments), and the peak power density (PPD) resulting from APEFC tests.

(FIG. 13a) Under 100% RH; (FIG. 13b) under 50% RH.

(FIGS. 14a & b) RDE tests for Pt and MCS catalysts, respectively, in $O_2$-saturated alkaline solutions. Scan rate=5 mV/s. (FIG. 14c) Comparison of kinetic current densities ($j_k$) at 0.85 V (vs. RHE).

(FIG. 15a) Synchrotron X-ray diffraction (XRD) pattern, identifying the spinel cubic crystal structure with a lattice constant a=8.2938 Å (inset). X-ray wavelength λ=0.68876 Å. The raised baseline at around 10° is due to the carbon black support of the MCS. (FIG. 15b) X-ray absorption near edge structure (XANES) spectra. The K-edge absorptions of Mn and Co were collected, each with three reference samples. The formal valences of Mn and Co were determined to be +2.76 and +2.56, respectively, corresponding to a stoichiometry of $[Mn_{0.3}Co_{0.7}][Mn_{0.6}Co_{0.4}]_2O_4$. (FIG. 15c-

*d*) High-angle annular dark-field images from scanning transmission electron microscopy (HAADF-STEM) images of the MCS lattice, taken on zone axes of [110] and [112]. Models of lattice projection are provided, with a unit cell embedded in the picture, to interpret the atomic resolution images.

Figure 16:
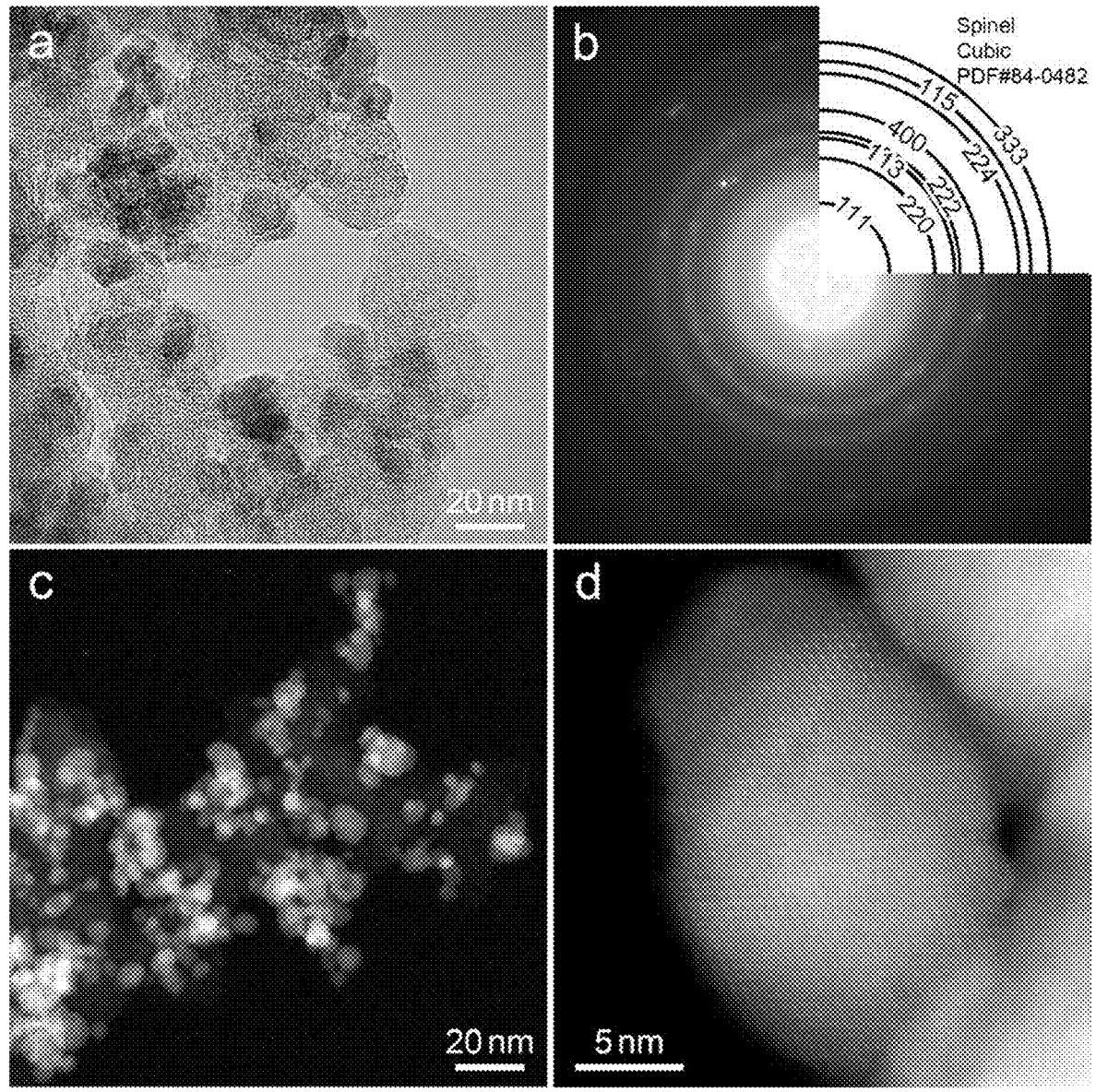

FIG. 16 depicts a STEM observation of MCS/C. (FIG. 16*a*) Bright-field image of MCS/C. (FIG. 16*b*) Electron diffraction pattern. (FIG. 16*c*) Dark-field image of MCS/C. (FIG. 16*d*) High-resolution dark-field image of MCS particles.

Figure 17:
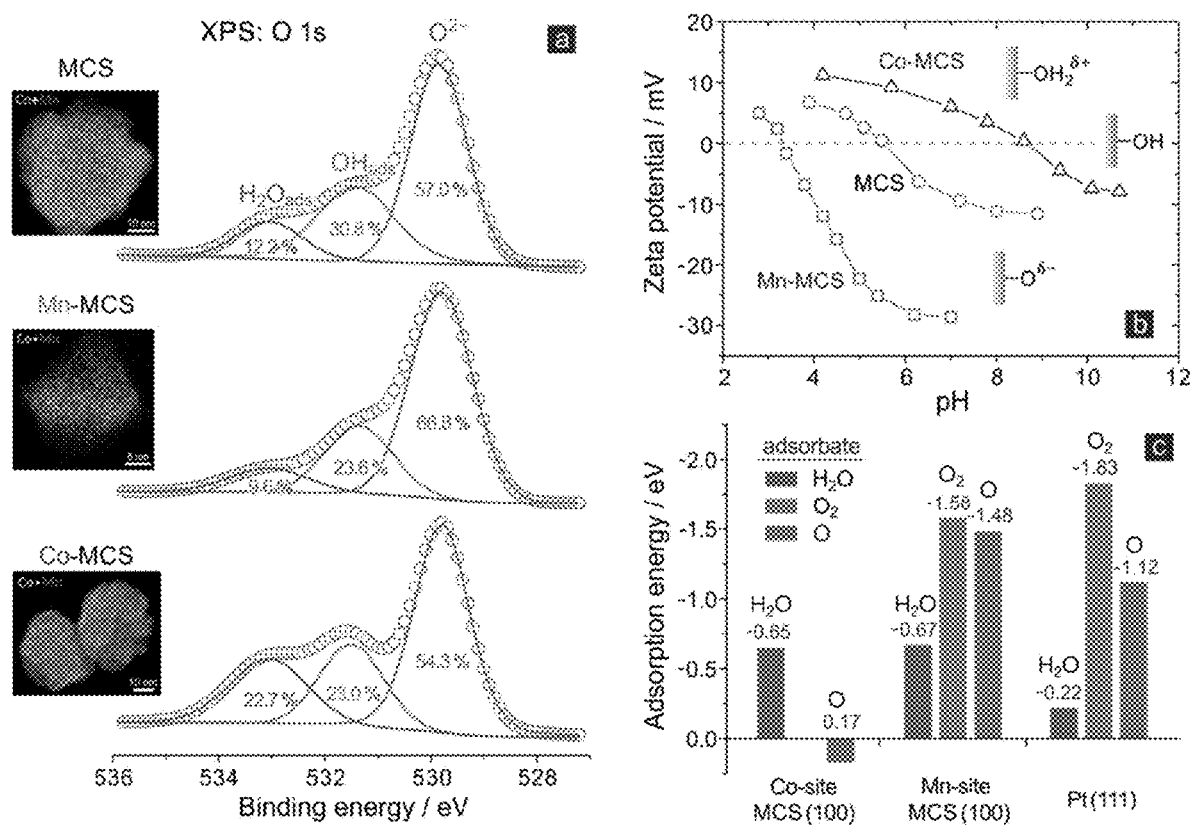

FIG. 17 depicts the results of surface analyses of MCS catalyst embodiments. (FIG. 17*a*) Oxygen 1s spectra of X-ray photoelectron spectroscopy (XPS) for MCS and two reference samples with Mn or Co enriched on the surface (denoted as Mn-MCS and Co-MCS, respectively). Insets are electron energy loss spectroscopy (EELS) mapping for these samples. Spectral deconvolution identified three distinct chemical environments of O, corresponding to those of $H_2O_{ads}$, $OH_{ads}$, and $O^{2-}$. (FIG. 17*b*) Zeta potential measurements for MCS, Mn-MCS, and Co-MCS particles dispersed in solutions of different pH. (FIG. 17*c*) Density functional theory (DFT) calculated adsorption energies for $H_2O$, $O_2$, and O on the Mn and Co sites of the MCS (100) surface, in comparison to those on Pt (111). No stable adsorption structure was found for $O_2$ on the Co site of MCS (100). The adsorption energy of O was defined relative to half the energy of $O_2$, such that negative values indicate a spontaneous dissociation of $O_2$ on the surface.

Figure 18:
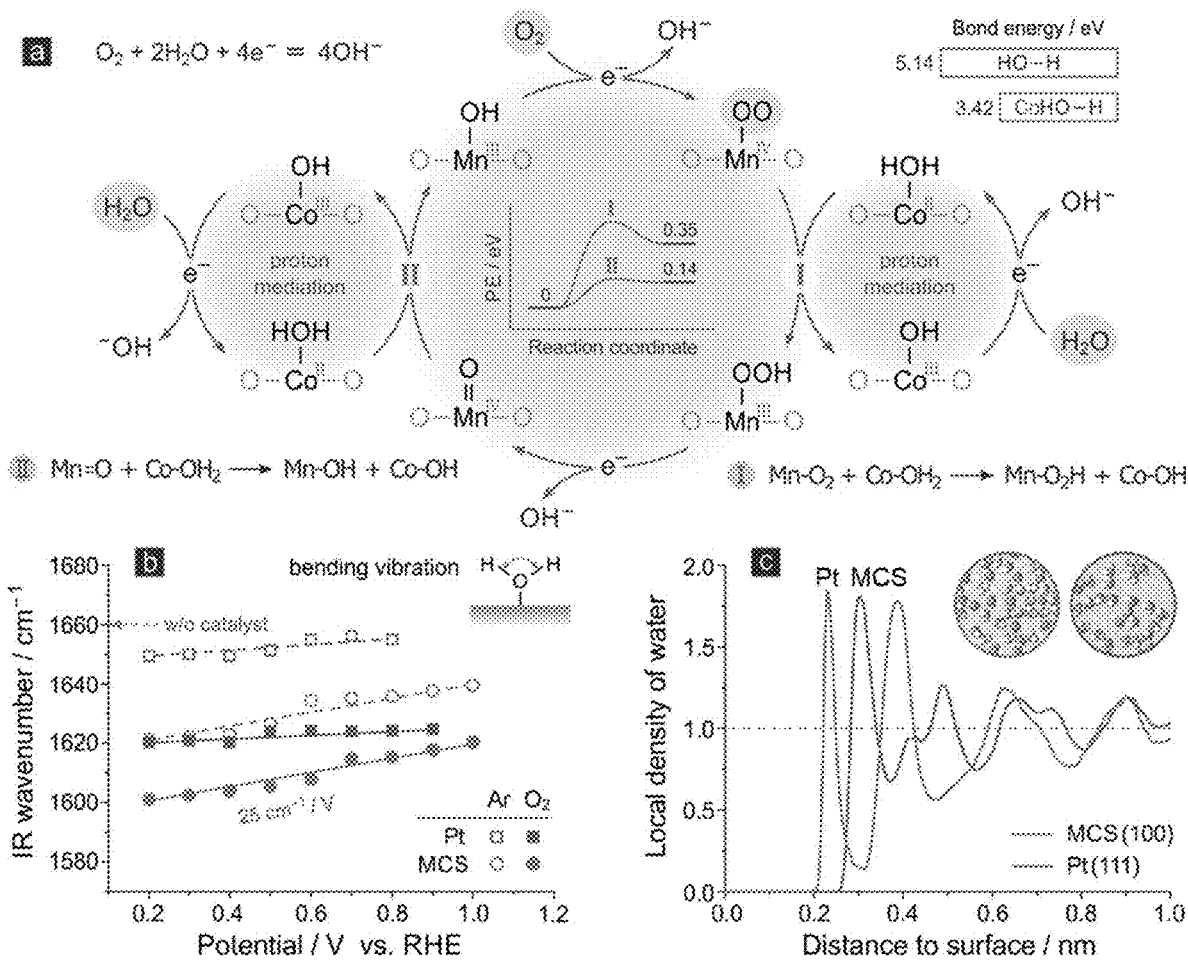

FIG. 18 shows a mechanistic analysis of an embodiment of MCS-catalyzed ORR. (FIG. 18*a*) Schematic illustration of the proposed synergistic mechanism of ORR on MCS, featuring the dissociative reduction of $O_2$ at the Mn site, the proton mediation by the Co site, and the surface proton transfer in between (reactions I and II). Inset central: DFT-calculated energy barriers for reactions I & II on MCS (100). Inset upper-right: DFT-calculated bond energies of O—H in $H_2O$ and Co—$OH_2$. (FIG. 18*b*) Results of in-situ attenuated total reflection Fourier transform infrared (ATR-FTIR) studies for MCS and Pt electrodes in Ar or $O_2$ saturated KOH solutions. The IR signals of interest were from the bending vibration of $H_2O$ (inset). The Stark effect (wavenumber shift with potential) is a measure of the $H_2O$ adsorption on the surface. (FIG. 18*c*) Local density of water on MCS (100) and Pt (111) surfaces at 300 K, obtained from atomistic molecular dynamics (MD) simulations. Inset: Snapshots of water molecules in a surface layer up to 0.3 nm thick.

Figure 19:
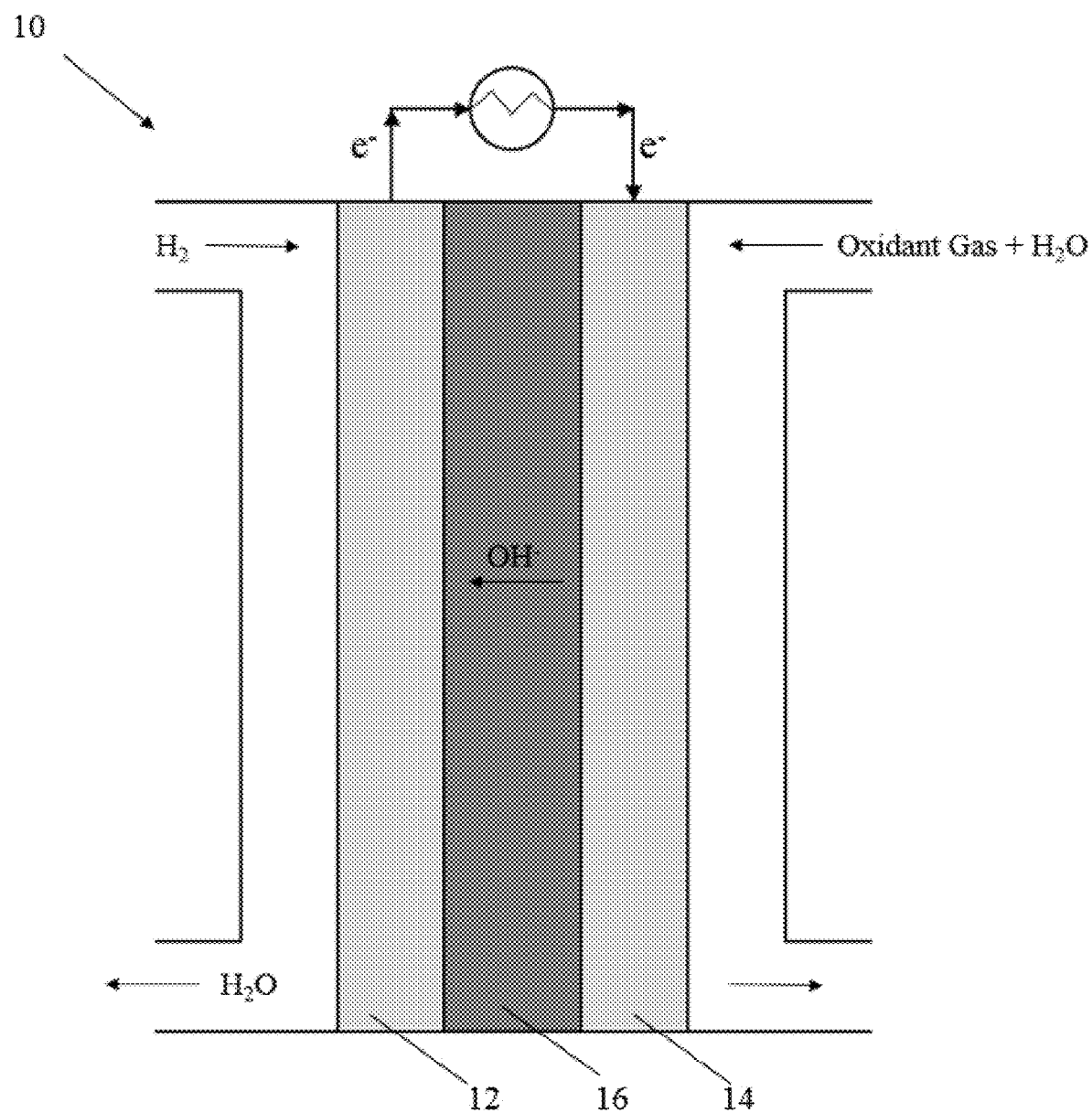

FIG. 19 is a simplified schematic of an embodiment of an AEMFC, which is intended for ease of understanding, and is not intended to be drawn to scale or stoichiometrically accurate.

Figure 20:
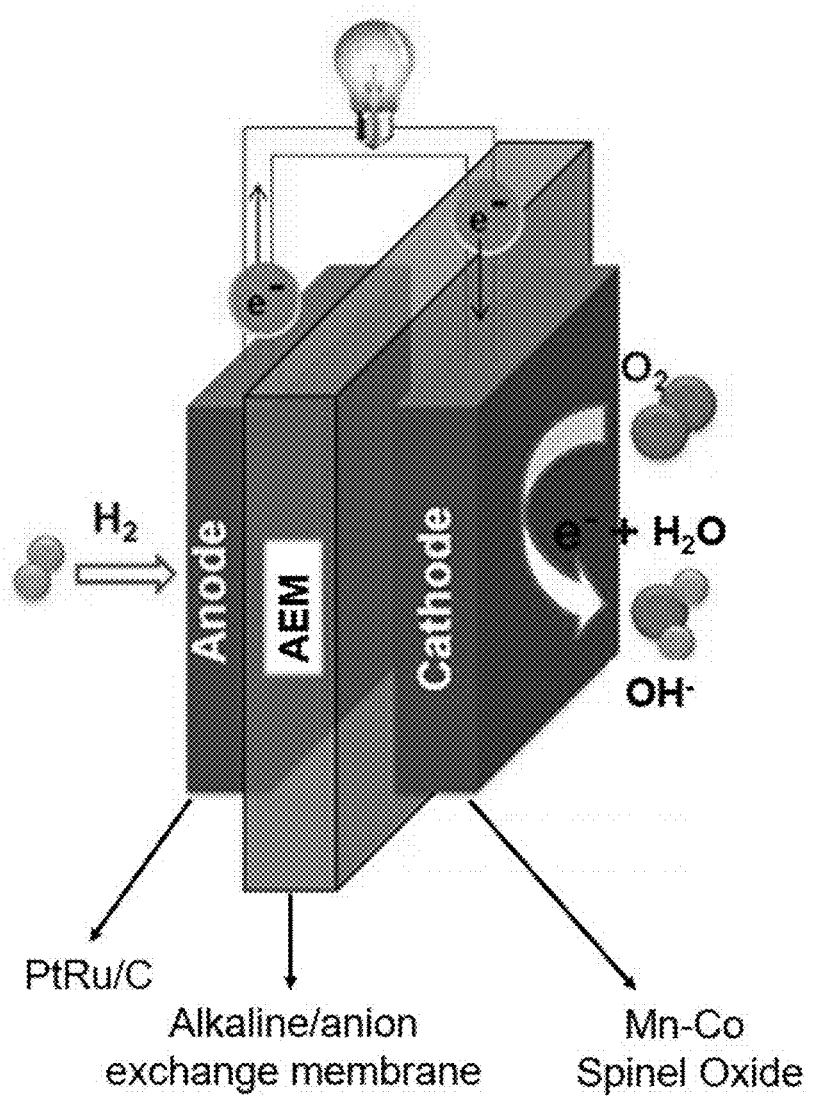

FIG. 20 is a simplified schematic of an embodiment of an MEA, which is intended for ease of understanding, and is not necessarily drawn to scale.

DETAILED DESCRIPTION OF THE INVENTION

This present invention relates to, inter alia, catalytically active carbon-supported porous Mn—Co spinel oxide nanoparticles of the formula $Mn_xCo_{3-x}O_4$, and to apparatuses and processes employing the same.

In the development of PEMFCs and APEFCs, the RDE has been widely used, in research laboratories, to screen electrocatalysts and evaluate their activity/durability. For example, RDE measurements showed a rather good quantitative agreement with MEA tests for the benchmark activities of Pt/C in PEMFCs. On the other hand, it has been reported that Mn—Co oxide catalysts had poor RDE activity. For example, in J. Am. Chem. Soc. 2012, 134, 3517-3523, it is reported that "substituted spinel oxides still exhibit a much lower mass activity compared with Pt-based materials. For example, in 6 M KOH at ~0.2 V vs Hg/HgO, a $MnCo_2O_4$-carbon black catalyst at 14 mg/cm² loading gave current density of 300 mA/cm² at 60° C., while Pt/CNT/C at 0.1 mg/cm² loading gave current density of 125 mA/cm² at 25° C." The reported data evidence only nominal current density of 300 mA/cm² at an elevated temperature (60° C.) with a very high loading, (14 mg/cm²). Critically, as temperature increases, the rate of the OR reaction (ORR) is likewise expected to increase; 60° C. is a high temperature for such a low current density. Moreover, to achieve even this nominal activity, an incredibly high catalyst loading (14 mg/cm²) was used. As the authors imply, high catalyst loadings are not practical. For example, high loadings complicate manufacturability, engineering of the electrode, and properties in the MEA such as reactant ingress and byproduct egress. While the presented data teach the inadequacies of MnCoO on carbon black, by using a very unique substrate, N-doped reduced graphene oxide, the limitations of the material's typical current density, as exhibited when the material is supported on commercial standard carbon black (such as Vulcan, Ketjen, etc.), were overcome.

Notwithstanding data reported in the literature regarding poor RDE-tested ORR performance of manganese-cobalt spinel $MnCo_2O_4$, Applicants have surprising found that embodiments of the inventive $Mn_xCo_{3-x}O_4$/C catalysts prove to have excellent catalytic activity in MEA's. These findings are discussed in Applicants' publications. See, *Nature Communications* volume 10, Article number: 1506 (2019); and *ACS Energy Lett.* 2019, 4, 6, 1251-1257.

Herein described are Mn—Co spinel oxide electrocatalysts as the oxygen cathode in practical MEA tests in APEFCs. An $MnCo_2O_4$/C (80 wt. %) embodiment exhibited a peak power density of 1.2 W/cm², a benchmark value compared to the state-of-art non-precious cathodes using N-doped carbon (<0.5 W/cm²), and 3d metal oxides (0.5-1 W/cm²). These findings suggest that embodiments of Co—Mn oxides could eventually achieve or surpass the performance of precious metal cathodes (e.g., Pt, Pd and Ag-based catalysts) in APEFCs (1.0-1.5 W/cm²).

Aspects of the present invention and certain features, advantages, and details thereof are explained more fully below with reference to the non-limiting embodiments discussed and illustrated herein and in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and not by way of limitation. Various substitutions, modifications, additions and/or arrangements within the spirit and/or scope of the underlying inventive concepts will be apparent to those skilled in the art from this disclosure.

In a first aspect, the invention provides a metal oxide/carbon catalyst composition comprising:

40 to 95 wt % metal oxide, said metal oxide being porous Mn—Co spinel oxide nanoparticles of the formula $Mn_xCo_{3-x}O_4$, said nanoparticles having an octahedral morphology, an average particle size of 5-100 nm, and average pore sizes of 1-5 nm, and wherein x is the atomic fraction of manganese (Mn), 3-x is the atomic fraction of cobalt (Co), and 0<x<3; and a carbon substrate comprising at least 96 atomic % carbon,
wherein the metal oxide nanoparticles are supported on the carbon substrate.

As noted above, the metal oxide is of the formula $Mn_xCo_{3-x}O_4$, wherein x is the atomic fraction of manganese (Mn), and 3-x is the atomic fraction of cobalt (Co). x is a number between 0 and 3 ($0<x<3$).

In some embodiments, x is 1, 1.5, 2, etc.

In some embodiments, x is 1.

In some embodiments, x is 2.

In some embodiments, the metal oxide is selected from $MnCo_2O_4$, $CoMn_2O_4$, and $Mn_{1.5}Co_{1.5}O_4$.

In some embodiments, the metal oxide is single-phase.

In some embodiments, the metal oxide is present in a tetragonal spinel phase.

In some embodiments, the metal oxide is present in a cubic spinel phase.

In some embodiments, the metal oxide is $MnCo_2O_4$. In some embodiments, the $MnCo_2O_4$ has a cubic spinel structure.

In some embodiments, the metal oxide is $CoMn_2O_4$. In some embodiments, the $CoMn_2O_4$ has a tetragonal spinel structure.

In some embodiments, the metal oxide is $Mn_{1.5}Co_{1.5}O_4$. In some embodiments, the $Mn_{1.5}Co_{1.5}O_4$ has a cubic spinel structure.

In some embodiments, the components of the metal oxide are homogeneously mixed.

The $Mn_xCo_{3-x}O_4$ nanoparticles have a particle size of size of 5-100 nm (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 nm, including any and all ranges and subranges therein, e.g. 10 to 100 nm, 10 to 50 nm, 15 to 40 nm, etc.).

The metal oxide is porous, having a plurality pores. The pores have an average size of 1 to 5 nm (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 nm, including any and all ranges and subranges therein, e.g., 2 to 4 nm).

The metal oxide/carbon catalyst composition comprises 40 to 95 wt % of the metal oxide (e.g., 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %, including any and all ranges and subranges therein, e.g., 40 to 90 wt %, 50 to 85 wt %, 60 to 85 wt %, 60 to 80 wt %, etc.).

In some embodiments, the metal oxide nanoparticles are spherical in shape.

In some embodiments, the metal oxide nanoparticles are substantially spherical in shape. For example, in some embodiments, the nanoparticles deviate from spherical by less than or equal to 10% (e.g., by less than or equal to 10, 9, 8, 7, 6, 5, 4, 3, 2, or 1%).

The metal oxide/carbon catalyst composition comprises, in addition to the metal oxide, a carbon substrate, which supports the metal oxide nanoparticles.

The carbon substrate comprises at least 96 atomic % carbon (C). In some embodiments, the carbon substrate comprises at least 96.0, 96.1, 96.2, 96.3, 96.4, 96.5, 96.6, 96.7, 96.8, 96.9, 97.0, 97.1, 97.2, 97.3, 97.4, 97.5, 97.6, 97.7, 97.8, 97.9, 98.0, 98.1, 98.2, 98.3, 98.4, 98.5, 98.6, 98.7, 98.8, 98.9, 99.0, 99.1, 99.2, 99.3, 99.4, 99.5, 99.6, 99.7, 99.8, or 99.9 atomic % carbon. In some embodiments, the carbon substrate consists of carbon.

In some embodiments, the carbon substrate is selected from one or more of graphite, amorphous carbon, hard carbon, soft carbon, acetylene black, mesocarbon microbeads (MCMB), carbon black (e.g., Ketjen black or Vulcan XC-72), mesoporous carbon, porous carbon matrix, carbon nanotubes, carbon nanofibers, and graphene.

In some embodiments, the carbon substrate is carbon black (e.g., Ketjen black or Vulcan XC-72).

In some embodiments, the carbon substrate does not comprise graphene oxide (including reduced graphene oxide).

In some embodiments, the carbon substrate is a non-doped carbon substrate.

In some embodiments, the carbon substrate is not doped with nitrogen.

In some embodiments, the carbon substrate does not comprises nitrogen-containing functional groups. In some embodiments, the carbon substrate is non-functionalized (i.e., does not comprise functional groups).

In some embodiments, the metal oxide/carbon catalyst composition comprises 5 to 60 wt % carbon (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %, including any and all ranges and subranges therein, e.g., 10 to 60 wt %, 15 to 50 wt %, 15 to 40 wt %, 20 to 40 wt %, etc.).

In some embodiments, the sum of the metal oxide and the carbon in the metal oxide/carbon catalyst constitute 85 to 100 wt % of the metal oxide/carbon catalyst (e.g., 85, 86, 87, 88, 89, 90, 91, 92, 93, 94, 95, 96, 97, 98, 99, 99.5, 99.9, or 100 wt %, including any and all ranges and subranges therein).

In a second aspect, the invention provides an apparatus comprising an anode, a cathode, and a charge-passing material between the anode and the cathode, wherein the cathode comprises a metal oxide/carbon catalyst composition according to the first aspect of the invention.

The apparatus can comprise any embodiment according to the first aspect of the invention.

In some embodiments, the apparatus is configured to transport hydroxide anions ($OH^-$) from one electrode to the other.

In some embodiments, the apparatus is a fuel cell (e.g., an anion-exchange membrane fuel cell (AEMFC)) or a membrane electrode assembly (MEA), e.g., an MEA for use in an alkaline polymer electrolyte membrane fuel cell (PEMFC), or a device comprising an inventive embodiment of AEMFC or MEA. Both AEMFC's and MEA's are known in the art.

AEMFC's—also known as alkaline polymer electrolyte fuel cells (APEFC's)—are alkaline fuel cells that comprise a solid polymer electrolyte, i.e., an alkaline exchange membrane (AEM). Currently, the most popular commercialized fuel cells are proton exchange membrane fuel cells (PEMFC's). PEMFC's and AEMFC's both generate electricity, but PEMFC's operate in acidic media, and comprise a proton-conducting polymer electrolyte membrane, whereas AEMFC's operate in alkaline media and comprise an AEM that conducts anions (such as $OH^-$). In addition to the fact that the solid membrane in AEMFC's is an alkaline AEM instead of an acidic PEM, AEMFC's can be further distinguished from PEMFC's in that, for AEMFC's, the AEM transports ions (e.g., hydroxide ions, $OH^-$) from the cathode to the anode, whereas proton ($H^+$) conduction in a PEMFC goes from anode to cathode. The use of the AEM in the AEMFC creates an alkaline pH cell environment, thereby attractively opening up the possibilities for, inter alia, enhanced oxygen reduction catalysis (which could allow for the use of less expensive, e.g., platinum—(Pt) free catalysts, or catalysts that do not require Pt), extended range of fuel cell materials to be used (e.g., stable in the AEMFC, but that may not have sufficient stability in an acidic environment), and different range of possible membrane materials.

Depending on, e.g., the cathode oxidant gas, different anions are present in different amounts during the operation of an AEMFC. For example, when ambient air is used, anions present during operation of the AEMFC can include $HCO_3^-$, $CO_3^{2-}$, and $OH^-$. Typically, though, when operated at high current densities, the most common anion species present across the AEM membrane is the hydroxide anion ($OH^-$), initially present and also generated via electrochemical ORR at the cathode of the AEMFC.

During operation of an AEMFC, the $OH^-$ is transported from the cathode to the anode. If hydrogen is used as fuel, the following oxidation reaction takes place at the anode:

$$2OH^- + H_2 \rightarrow 2H_2O + 2e^-$$

Thus, similar to PEMFC's, AEMFC's also produce water as a byproduct, but the water generated in an AEMFC is twice as much as in a PEMFC, per electron. Further, water is a reactant at the cathode.

The above discussion demonstrates various significant differences between AEMFC's and PEMFC's. Indeed, the alkaline environment and AEM, and different ORR and HOR mechanisms result in AEMFC's being significantly different from PEMFC's. Environmental and electrochemical differences between AEMFC's and PEMFC's are such that entirely different materials are used in the fuel cells, and materials useful for one type of fuel cell cannot be expected to be (and are often not) useful in the other. This point is exemplified, for example, by the fact that, while in acidic media $H_2$ oxidation kinetics on platinum (Pt) are very facile, in alkaline media, $H_2$ oxidation kinetics on Pt are very sluggish, being over 100 times slower than in acidic media. Thus, a need exists for improved materials that are specifically useful in alkaline conditions and for the development of improved AEMFC's. The Applicants have found that the catalytically active metal oxide/carbon composition described herein offers such use, including, for example, as new cathode catalysts for AEMFC's and membrane electrode assemblies (MEA's).

In some embodiments, the invention provides an apparatus comprising an anode, a cathode, and a charge-passing material between the anode and the cathode, the apparatus being an anion-exchange membrane fuel cell (AEMFC) or a membrane electrode assembly (MEA), wherein the cathode comprises a metal oxide/carbon catalyst composition comprising:

40 to 95 wt % metal oxide, said metal oxide being porous Mn—Co spinel oxide nanoparticles of the formula $Mn_xCo_{3-x}O_4$, said nanoparticles having an octahedral morphology, an average particle size of 5-100 nm, and average pore sizes of 1-5 nm, and wherein x is the atomic fraction of manganese (Mn), 3-x is the atomic fraction of cobalt (Co), and 0<x<3; and a carbon substrate comprising at least 96 atomic % carbon, wherein the metal oxide nanoparticles are supported on the carbon substrate.

FIG. 19 is a simple schematic of an embodiment of an AEMFC 10. The schematic is for ease of reference and understanding; it is not necessarily drawn to scale, and, where reactants, anions, and products are shown, such illustration does not purport to convey accurate reaction stoichiometry. Referring to FIG. 19, AEMFC 10 comprises anode 12, cathode 14, and AEM 16.

In some embodiments, the AEMFC (or the cathode thereof) anode does not comprise platinum and/or copper.

In some embodiments, the AEMFC does not comprise platinum and/or copper.

In some embodiments, the AEMFC is configured to use pure oxygen or air as a cathode oxidant gas. In some embodiments, the air is ambient air, $CO_2$-free air (also known as synthetic, or pure air), or $CO_2$-filtered air.

In some embodiments, the AEMFC is configured to use, as fuel, hydrogen or methanol. In particular embodiments, the AEMFC is configured to use hydrogen.

The AEM separates the anode and the cathode, and conducts $OH^-$ ions from the cathode to the anode. The AEM may be any anion exchange membrane configured for use in an AEMFC.

In some embodiments, the AEM is a polymeric anion exchange membrane comprising cationic moieties that are fixed to or within polymeric chains (vs., e.g., a liquid electrolyte, within which the cationic moieties would be freely mobile). In some embodiments, the AEM comprises a polymer backbone having cationic groups incorporated therein (e.g., alkylated poly(benzimidazoles)). In some embodiments, the AEM comprises a polymer backbone having cationic groups pendant/tethered thereto. For example, in some embodiments, the AEM comprises a hydroxide-conducting functionalized polysulfone (e.g., functionalized via chloromethylation, followed by reaction with a phosphine or quaternization with an amine to yield a phosphonium or ammonium salt that can be alkalinized, e.g., with KOH, to yield a hydroxide-conducting AEM). In some embodiments, the AEM comprises a quaternary ammonium polysulfone. In some embodiments, the AEM is based on a xylylene ionene.

FIG. 20 is a simplified schematic of an embodiment of an MEA. As shown, the MEA comprises an alkaline/anion exchange membrane (AEM). An anode is disposed on one surface of the AEM, and a cathode comprising the inventive metal oxide/carbon catalyst is disposed on the opposite surface of the AEM.

In some embodiments, the inventive apparatus comprises a cathode having a metal oxide/carbon catalyst loading of at least 0.4 to 2.0 $mg_{metal\ oxide}/cm^2$ (e.g., 0.4, 0.5, 0.6, 0.7, 0.8, 0.9, 1.0, 1.1, 1.2, 1.3, 1.4, 1.5, 1.6, 1.7, 1.8, 1.9, or 2.0 $mg_{metal\ oxide}/cm^2$, including any and all ranges and subranges therein, e.g., 0.6 to 1.6 $mg_{metal\ oxide}/cm^2$, 0.8 to 1.5 $mg_{metal\ oxide}/cm^2$, 0.8 to 1.2 $mg_{metal\ oxide}/cm^2$, 0.7 to 1.2 $mg_{metal\ oxide}/cm^2$, etc.) As used herein, the subscript "metal oxide" in "$mg_{metal\ oxide}/cm^2$" refers to the metal oxide without the consideration of carbon. For example, where a metal oxide/carbon catalyst has mass fraction of metal oxide of 80%, and a mass fraction of carbon of 20%, a metal oxide loading of 0.8 mg/cm² (0 m8 $mg_{metal\ oxide}/cm^2$) means a total metal oxide/carbon catalyst loading of 1.0 mg/cm².

In some embodiments, the inventive apparatus comprises a cathode having a metal oxide/carbon catalyst loading of at least 0.6 $mg_{metal\ oxide}/cm^2$ (e.g., at least 0.6, 0.7, 0.8, 0.9, or 1.0 $mg_{metal\ oxide}/cm^2$).

In some embodiments, the inventive apparatus exhibits a peak power density of at least 0.8 W/cm² (e.g., at least 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, or 1.20 W/cm$^2$) at a current density of 2.0 A/cm$^2$. In some embodiments, such performance is exhibited at a temperature of 60° C. or 80° C.

In some embodiments, the inventive apparatus exhibits a peak power density of at least 0.8 W/cm$^2$ (e.g., at least 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, or 1.20 W/cm$^2$) at a current density of greater than or equal to 2.0 A/cm$^2$ (e.g., at a current density greater than or equal to 2.0, 2.1, 2.2, 2.3, 2.4, 2.5, or 2.6 A/cm$^2$). In some embodiments, such performance is exhibited at a temperature of 60° C. or 80° C.

In some embodiments, when operating the apparatus at 80° C. with 0.1 MPa back-pressure, the apparatus exhibits a peak power density of at least 0.8 W/cm$^2$ (e.g., at least 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, or 1.20 W/cm$^2$) at a current density of greater than or equal to 2.0 A/cm$^2$ (e.g., at a current density greater than or equal to 2.0, 2.1, 2.2, 2.3, 2.4, 2.5, or 2.6 A/cm$^2$). In some embodiments, such performance is exhibited at a temperature of 60° C. or 80° C.

In some embodiments, the metal oxide/carbon catalyst composition is present in a catalyst layer having a thickness of 5 to 40 μm (e.g. 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 μm, including any and ranges and subranges therein).

In some embodiments, the apparatus comprises a platinum-based (e.g., PtRu/C or Pt/C) anode.

In some embodiments, the apparatus comprises an alkaline polymer membrane.

In some embodiments, the apparatus is comprised within a device, e.g., a fuel cell, battery (e.g., a metal air battery), electrolyzer, etc. In some embodiments, the apparatus or device operates under alkaline (>pH 7) conditions.

In a third aspect, the invention provides an electrocatalytic process, wherein said process comprises use of the metal oxide/carbon catalyst according to the first aspect of the invention.

In some embodiments, the invention provides an electrocatalytic process comprising providing or operating an apparatus according to the second aspect of the invention. In some embodiments, the process comprises use of the metal oxide/carbon catalyst in the cathode to perform an oxygen reduction reaction (ORR).

In some embodiments the electrocatalytic process entails a method of electrocatalysis comprising use of the inventive metal oxide/carbon catalyst (e.g., as an anode or cathode catalyst).

The electrocatalytic process can comprise use of any embodiment according to the first and/or second aspects of the invention, optionally in combination with properties of any other embodiment(s) according to the first and/or second aspect of the invention.

In some embodiments, the electrocatalytic process comprises operating an apparatus according to the second aspect of the invention.

In some embodiments, the electrocatalytic process is performed at a pH >7.

In some embodiments, the electrocatalytic process does not comprise use of a platinum (Pt)-containing catalyst.

EXAMPLES

The invention will now be illustrated, but not limited, by reference to the specific embodiments described in the following examples.

Synthesis of $MnCo_2O_4$/and $CoMn_2O_4$/C.

Spinel oxides, $MnCo_2O_4$/ and $CoMn_2O_4$/C were synthesized using a facial hydrothermal method. $Mn(Ac)_2.4H_2O$ and $Co(Ac)_2.4H_2O$, were dissolved in 15 mL deionized (DI) water and sonicated for 15 min. 500 μL of concentrated $NH_3.H_2O$ were diluted in 5 mL of DI water and added to the metal precursor solution dropwise under vigorous stirring at 1200 rpm. The pH of the formed metal-$NH_3$ complex solution was tested to be around 11. Ethanol (20 mL) was later added to the metal-$NH_3$ complex solution with an EtOH/$H_2O$ volume ratio of 1:1. High-surface-area carbon Ketjen Black (HSC KB) was weighted to achieve target metal oxide loadings of 40, 60 and 80 wt. % in the catalyst/carbon composites. HSC KB was added to the suspension solution and stirred at 1200 rpm and 60° C. for a 12 hour aging process. The solution was then transferred into a 50 mL autoclave for hydrothermal reaction at 150° C. with an inner pressure of 30 bar for 3 hours. $MnCo_2O_4$ and $CoMn_2O_4$ NPs supported on carbon was separated from the residual solution using a centrifuge at 6000 rpm and washed with EtOH/$H_2O$ (vol. 1:1) three times and dried in oven at 80° C. for 6 hours. During the synthesis of $MnCo_2O_4$/C, Mn precursors were added later into the $[Co(NH_3)_6^{2+}]$ solution to maintain the cubic spinel structure. There was no difference for the tetragonal $CoMn_2O_4$/C on whether Mn precursors were added later or at the same time as the Co precursors were added. Catalyst synthesis could be achieved at the gram-level with desirable single phase and controllable particle size, showing the potential for large-scale production.

Structural Characterizations.

The crystal structure of all the synthesized electrocatalysts are examined by powder X-ray diffraction (XRD) using a Rigaku Ultima IV Diffractometer. Diffraction patterns were collected at a scan rate of 2°/min at 0.02° steps from 20° to 80°. Specific surface area and pore size distributions were analyzed based on the Brunauer-Emmett-Teller (BET) and Barrett-Joyner-Halenda (BJH) methods from the $N_2$ adsorption-desorption isotherms acquired at −195° C. (liquid $N_2$) in a Micromeritics ASAP2020 instrument. Scanning transmission electron microscopy (STEM) images with subångstrom spatial resolution were acquired on a fifth-order aberration-corrected STEM (Cornell Nion UltraSTEM) operated at 100 keV with a beam convergence semi-angle of 30 mrad.

Electrochemical Characterization.

5.0 mg of electrocatalysts were mixed with 1.0 mL 0.05 wt % Nafion/ethanol solution and subsequently sonicated for approximately 30 minutes to form a homogenous catalyst ink. 25 μL of the resulting catalyst ink were loaded onto a glassy carbon (GC) electrode (D=5.0 mm, Pine Instrument) as the working electrode (WE), achieving a catalyst loading of 0.25 mg/cm$^2$, followed by thermal evaporation of the solvent under infrared light. A Ag/AgCl in saturated KCl solution, with a salt bridge separated from the WE, served as the reference electrode (RE) and a large-area graphite rod was used as the counter electrode (CE). The potential difference between Ag/AgCl in saturated KCl and the reversible hydrogen electrode (RHE) in 1M KOH was calculated to be 1.0258 V based on the Nernst equation. Electrochemical measurements were performed on a Solartron potentiostat. ORR measurements were performed with a rotating disk electrode (RDE, Pine Instrument) in oxygen-saturated 1M KOH solution at room temperature (23° C.) at a rotation rate of 1600 rpm and a scan rate of 5 mV/s.

Membrane-Electrode Assembly (MEA) and Fuel Cell Tests.

The alkaline polymer electrolyte (APE) and ionomer binder used in fuel cells were both quaternary ammonium poly(N-methyl-piperidine-co-p-terphenyl) (QAPPT) with an ion-exchange capacity (IEC) of 2.58 mmol/g. The catalyst ink was prepared by mixing PtRu/C (60% w/w in metal content) or Co—Mn oxides/C with ionomer binder (catalyst:ionomer=4:1 wt./wt.), dispersed with n-propanol and ultrasonicated for half an hour. The ink was then sprayed on the QAPPT membrane (Cl$^-$ form, 30±3 μm in dry state), forming a catalyst-coated membrane (CCM) with an electrode area of 4 cm$^2$. The metal loading of PtRu in the anode was 0.4 mg/cm$^2$. Next, the prepared CCM was soaked in 1 M KOH for 24 h at 55° C. to exchange Cl$^-$ with OH$^-$, and washed with distilled water before fuel cell tests to remove the excess KOH. The resulting CCM was positioned between two pieces of Teflon-treated carbon paper (AvCarb GDS3250) to make the membrane electrode assembly (MEA) in situ: no hot-pressing was required. $H_2/O_2$ single cell APEFCs were tested using an 850E Multi Range fuel cell test station (Scribner Associates, USA) in a galvanic mode at 60° C. or 80° C. $H_2$ and $O_2$ were fully humidified at 60° C. or 80° C. (100% RH) and fed with a flow rate 1000 mL/min and a backpressure of either 0 or 0.1 MPa symmetrically on both sides. The fuel cell was briefly activated at a constant current and then the cell voltage at a series of current density was recorded.

Results and Discussion.

Figure 1:
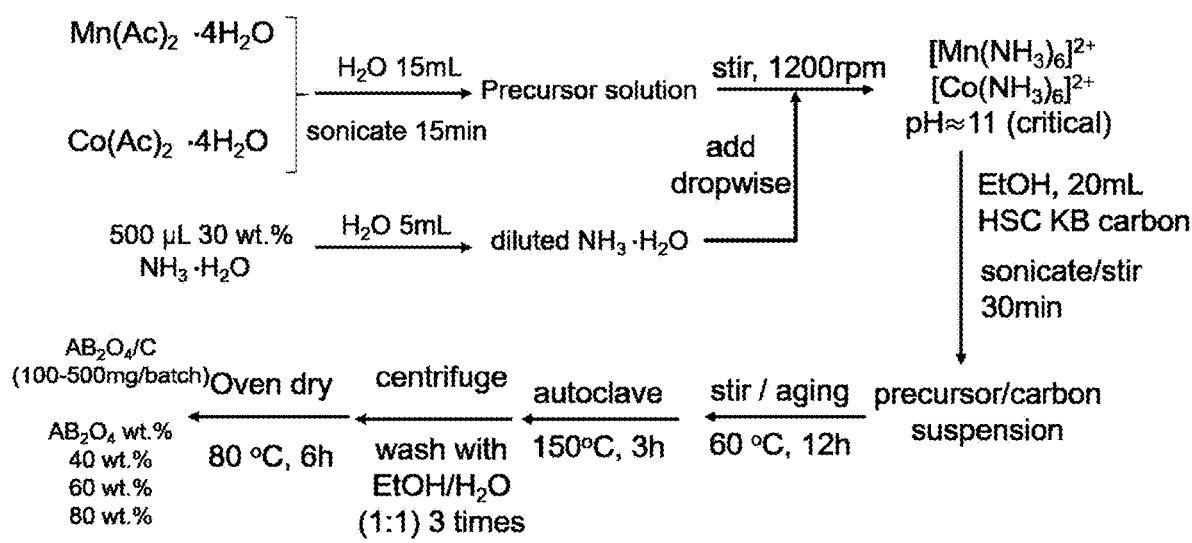
FIG. 1 is a synthesis flow chart of spinel-type $MnCo_2O_4$/C and $CoMn_2O_4$/C with various metal oxide loadings on high-surface-area carbon Ketjen Black.

$MnCo_2O_4$ and $CoMn_2O_4$ nanoparticles (NPs) were synthesized using a facile hydrothermal method, using an autoclave, with various metal oxide loadings on carbon supports. FIG. 1 is a synthesis flow chart of spinel-type $MnCo_2O_4$/C and $CoMn_2O_4$/C with various metal oxide loadings on HSC KB. Briefly, metal precursors were reacted with ammonium hydroxide to form coordination compounds, which gradually produced metal hydroxide precipitation from the solution through an aging process, at controlled temperatures with selected solvents. Metal hydroxides finally formed spinel metal oxide NPs, supported on high-surface-area carbon Ketjen black (HSC KB) with desired mass loadings.

In general, the pH and ethanol/$H_2O$ volume ratio of the solvent control the precipitation rate of metal hydroxides, and therefore those influence the final metal oxide particle size, morphology and distribution on the carbon substrate. HSC KB has a mesoporous structure and a large Brunauer-Emmett-Teller (BET) surface area of 900 m$^2$/g, which served as a better carbon support than the solid carbon, Vulcan XC-72 with a BET surface area of 250 m$^2$/g in early reports in PEFMCs.

Figure 2:
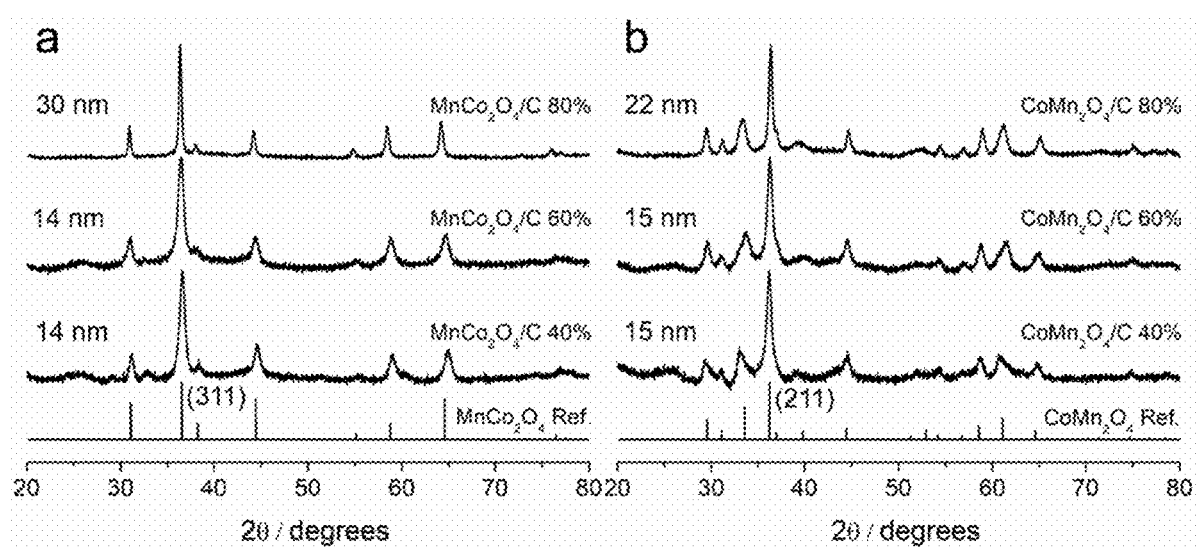
FIG. 2 depicts powder XRD patterns of $MnCo_2O_4$ and $CoMn_2O_4$ nanoparticles with 40, 60 and 80 wt. % metal oxide loadings on high-surface-area carbon Ketjen Black (HSC KB), compared to XRD references of spinel-type $MnCo_2O_4$ and $CoMn_2O_4$. Domain sizes of $MnCo_2O_4$ and $CoMn_2O_4$ nanoparticles are listed on the left side of the XRD.

Crystal structures of $MnCo_2O_4$/C and $CoMn_2O_4$/C were examined using X-ray diffraction (XRD). FIG. 2 depicts powder XRD patterns of $MnCo_2O_4$ and $CoMn_2O_4$ nanoparticles with 40, 60 and 80 wt. % metal oxide loadings on high-surface-area carbon Ketjen Black (HSC KB), compared to XRD references of spinel-type $MnCo_2O_4$ and $CoMn_2O_4$. Domain sizes of $MnCo_2O_4$ and $CoMn_2O_4$ nanoparticles are listed on the left side of the XRD.

$MnCo_2O_4$/C with metal oxide loadings of 40, 60 and 80 wt. % all exhibited single-phase cubic spinel structures when compared to the $MnCo_2O_4$ reference (FIG. 2a). Such a high loading of 80 wt. % has not been reported before for the oxygen cathode in hydrogen fuel cells although it is a common value used for fabricating the metal oxide cathodes in Li-ion batteries. Average domain sizes of 40, 60, 80 wt. % $MnCo_2O_4$/C were calculated to be 14, 14 and 30 nm, respectively, using the major (311) peak based on the Scherrer equation. Larger domain sizes of 80 wt. %, relative to 40 and 60 wt. %, suggested that nanocrystals could grow into a larger size at a higher coverage of metal oxides on carbon. As a comparison, $CoMn_2O_4$/C, with various metal oxide loadings, showed a single-phase tetragonal spinel structures due to the strong Jahn-Teller effect of Mn (FIG. 2b). The domain size of 80. wt % $CoMn_2O_4$/C was calculated to be 22 nm using the (211) major diffraction peak (PDF #01-077-0471), which was slightly larger than those at 40 and 60 wt. % (15 nm).

Figure 3:
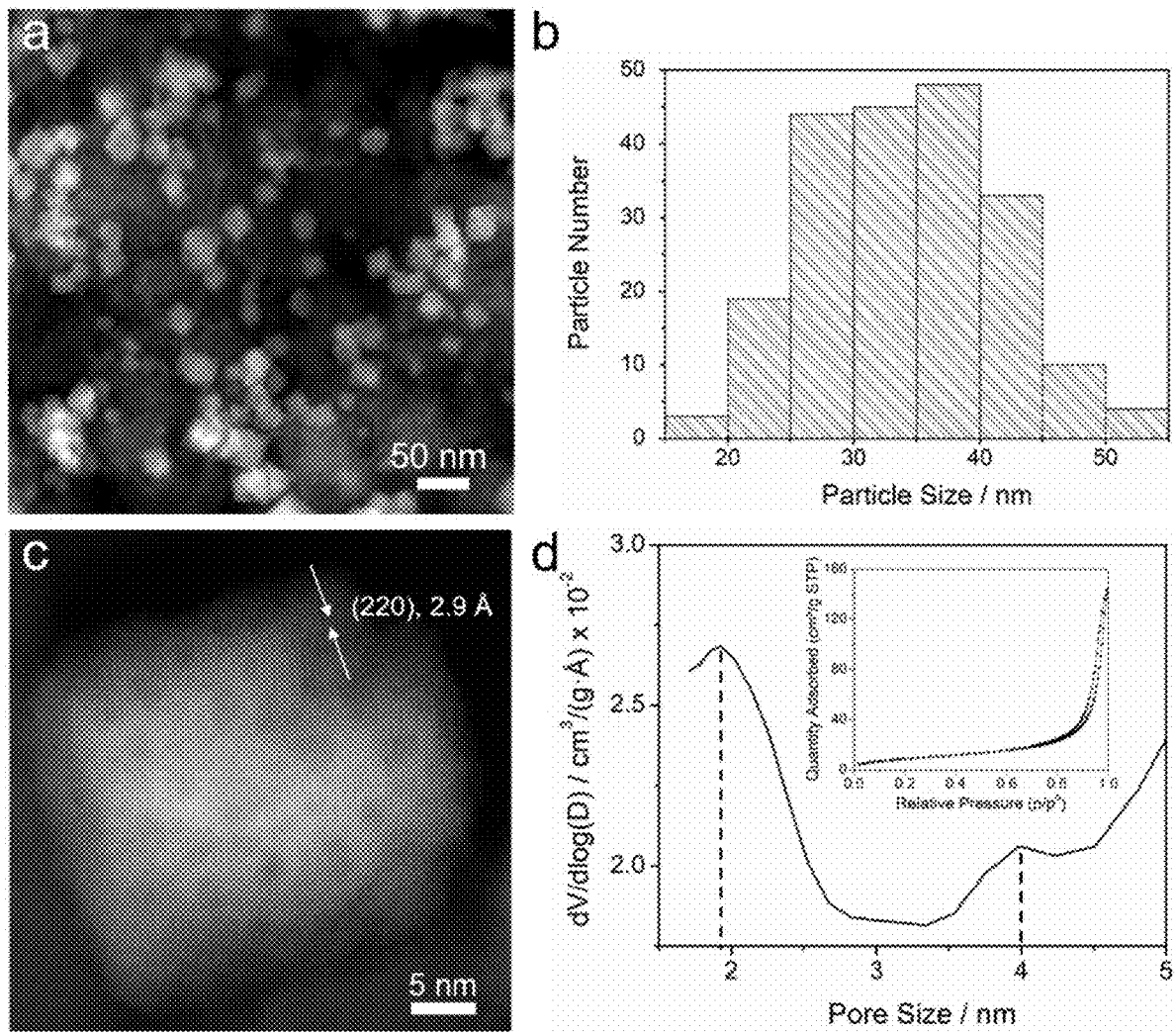
FIG. 3 shows data for $MnCo_2O_4$ embodiments.

The microstructure of Co—Mn NPs supported on HSC KB was examined using aberration-corrected high-angle annular dark-field (HAADF) scanning transmission electron microscopy (STEM) imaging. FIG. 3 shows data for $MnCo_2O_4$ embodiments. FIG. 3a depicts a HAADF-STEM image of $MnCo_2O_4$ with 40 wt. % metal oxide loading on HSC KB. FIG. 3b depicts a particle size distribution (PSD) histogram of $MnCo_2O_4$ nanoparticles. FIG. 3c depicts an atomic-scale STEM image of one $MnCo_2O_4$ particle with (220) lattice d-spacings (2.9 Å). FIG. 3d depicts a pore size distribution of $MnCo_2O_4$ without carbon support, derived from the $N_2$ adsorption-desorption isotherm in the inset. Dashed lines indicate the existence of micropores (1.9 nm) and small mesopores (4.0 nm) in the porous $MnCo_2O_4$ NPs.

Figure 4:
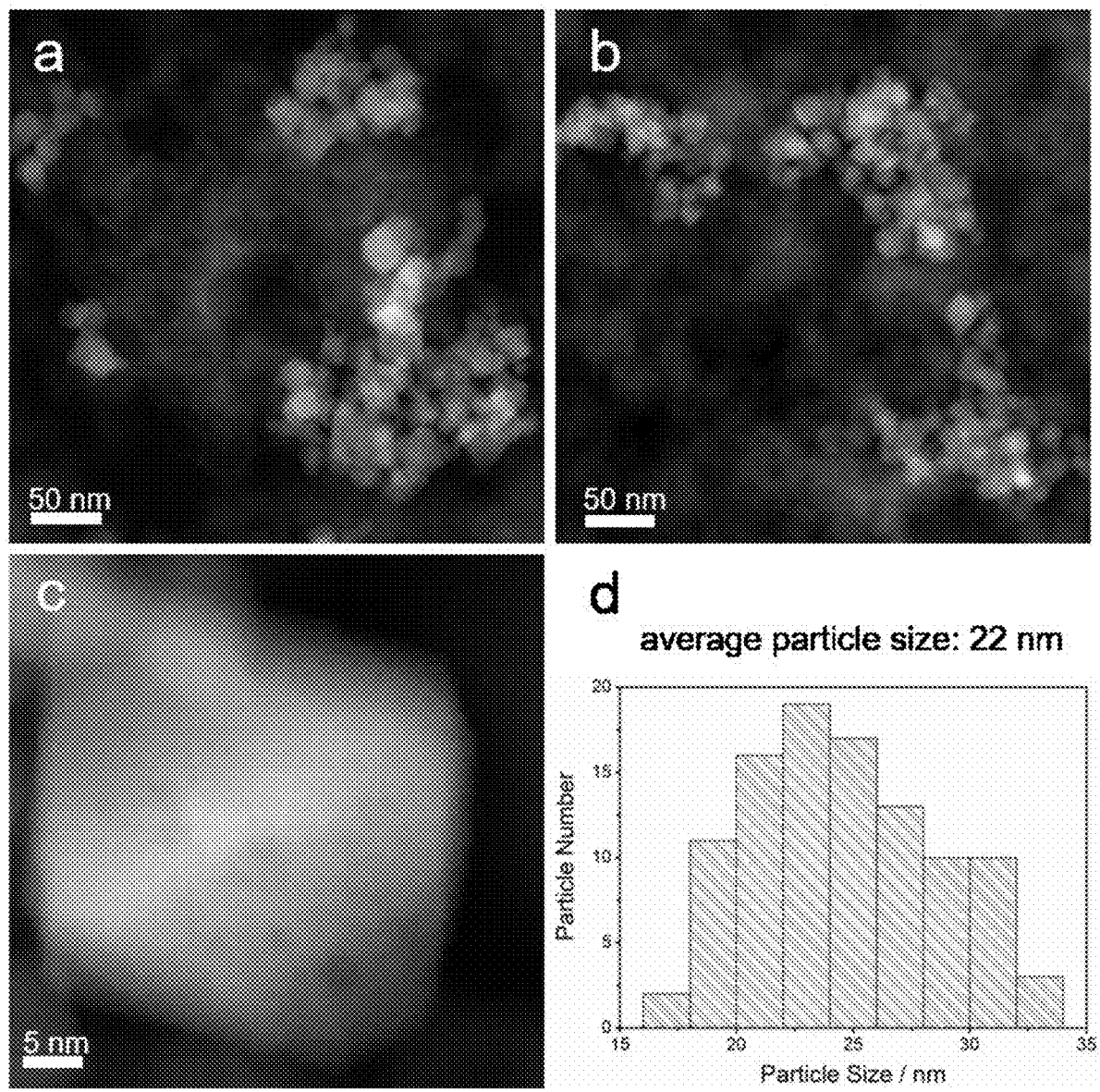
FIG. 4 shows data for $MnCo_2O_4$ embodiments.

As shown in FIG. 3a, $MnCo_2O_4$ NPs (40 wt. %) with an octahedral morphology were well embedded in the carbon matrix. Particle size distribution (PSD) histograms exhibited an average size of 35 nm (FIG. 3b), indicating the majority of the $MnCo_2O_4$ NPs have several sub-domains, given the XRD domain size of 14 nm. Atomic-scale STEM image further showed the internal structure of individual $MnCo_2O_4$ NPs. As shown in FIG. 3c, single-crystal $MnCo_2O_4$ particles showed lattice d-spacings of 2.9 Å, which matched the theoretical value, 2.93 Å, of $MnCo_2O_4$ (220) reflection (PDF #01-084-0482). Since STEM image intensity is proportional to atomic number and relative atomic density, the variation in image contrast suggests the existence of nm-sized pores. To quantify the porosity of $MnCo_2O_4$ without the influence of the mesoporous carbon substrate, $MnCo_2O_4$ metal oxides were also synthesized without adding HSC KB. The pore size distribution was derived from the $N_2$ adsorption-desorption isotherm using the Barrett-Joyer-Halenda (BJH) method (FIG. 3d). It shows major micropores of 1.9 nm as well as minor small mesopores of 4.0 nm, which are consistent with the pore sizes indicated from previous STEM images (FIG. 3c). The specific surface area was estimated to be 34 m$^2$/g based on the BET analysis (FIG. 3d, inset). $CoMn_2O_4$ NPs (40 wt. %) exhibited a similar octahedral morphology with an average particle size of 22 nm, which also indicated the existence of sub-domains and nm-sized pores, give the XRD domain size of 15 nm and the STEM image contrast variation (FIG. 4).

Figure 5:
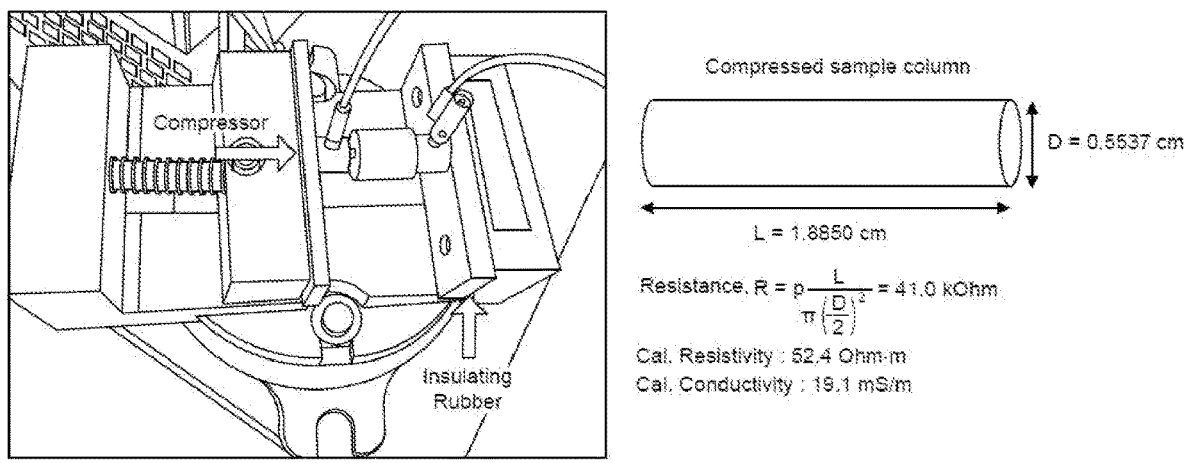
FIG. 5 provides two-point conductivity measurements. The sample holder was made of Aluminum with a resistance less than 0.2 Ohm. The length and diameter of the same column was measured using a Vernier calipers. The calculated conductivity represents a lower bound, relative to the true value since the sample may be further compressed under a bigger pressure.

The electrical conductivity of porous $MnCo_2O_4$, without carbon support, was estimated to be 19 mS/m, when compared to Si (1.6 mS/m) and amorphous carbon (10$^2$-10$^3$ S/m, FIG. 5). Given the fact that bulk $MnCo_2O_4$ is an insulator with a band gap of 2.11 eV, the electronic conductivity of $MnCo_2O_4$ NPs may come from crystal defects and small particle sizes, leading to a smaller ohmic resistance for the ORR.

Figure 6:
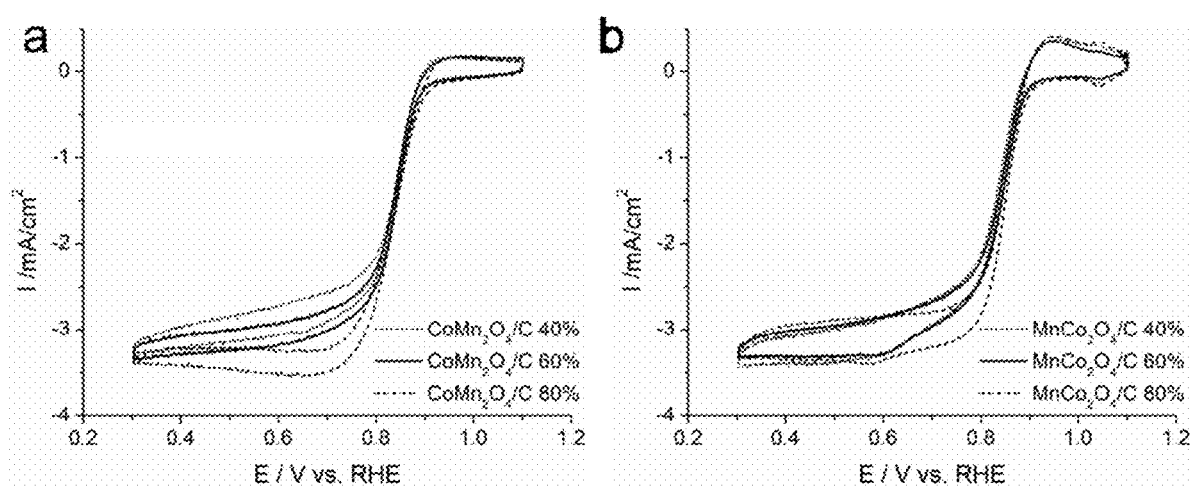
FIG. 6 depicts ORR polarization profiles for $MnCo_2O_4$ and $CoMn_2O_4$ with 40, 60 and 80 wt. % metal oxide loading on HSC KB in $O_2$-saturated 1M KOH at a rotation rate of 1600 rpm and a scan rate of 5 mV/s with a catalyst loading of 0.25 mg/cm².

After thorough structural examination, the Mn—Co spinel oxides with various metal oxide loadings were employed as electrocatalysts for the ORR in alkaline media. ORR polarizations profiles were acquired in $O_2$-saturated 1M KOH at a rotation rate of 1600 rpm and a scan rate of 5 mV/s with a catalyst loading of 0.25 mg/cm$^2$. While the metal oxide loadings increased from 40 to 60 and finally 80 wt. %, $CoMn_2O_4$/C showed a similar ORR activity with a half-wave potential ($E_{1/2}$) of around 0.84 V vs. RHE and $\Delta E_{1/2}$<3 mV (FIG. 6a). Noticeable changes only appeared when the potential was lower than 0.8 V vs. the reversible hydrogen electrode (RHE). $CoMn_2O_4$/C with an 80 wt. % metal oxide loading achieved the desired diffusion-limited current density at a more positive potential, relative to samples with 60% and 40% loadings. When compared to $CoMn_2O_4$/C, $MnCo_2O_4$ also exhibited a similar ORR activity with changes in $E_{1/2}$ less than 5 mV as the metal oxide loading increased from 40 to 80 wt. % (FIG. 6b). Similar improvement in the high-polarization region was also observed at higher loading despite the small differences between 40% and 60 wt. %.

One may conclude that $MnCo_2O_4$/C and $CoMn_2O_4$/C with high loading (60 and 80 wt. %) do not present significant advantages as ORR electrocatalysts, relative to the 40 wt. %, which is commonly reported as the metal oxide loading for both RDE and MEA measurements in the literature. However, later practical MEA tests of Mn—Co oxides demonstrated an unexpected difference in performance with various metal oxide loadings on carbon.

Figure 7:
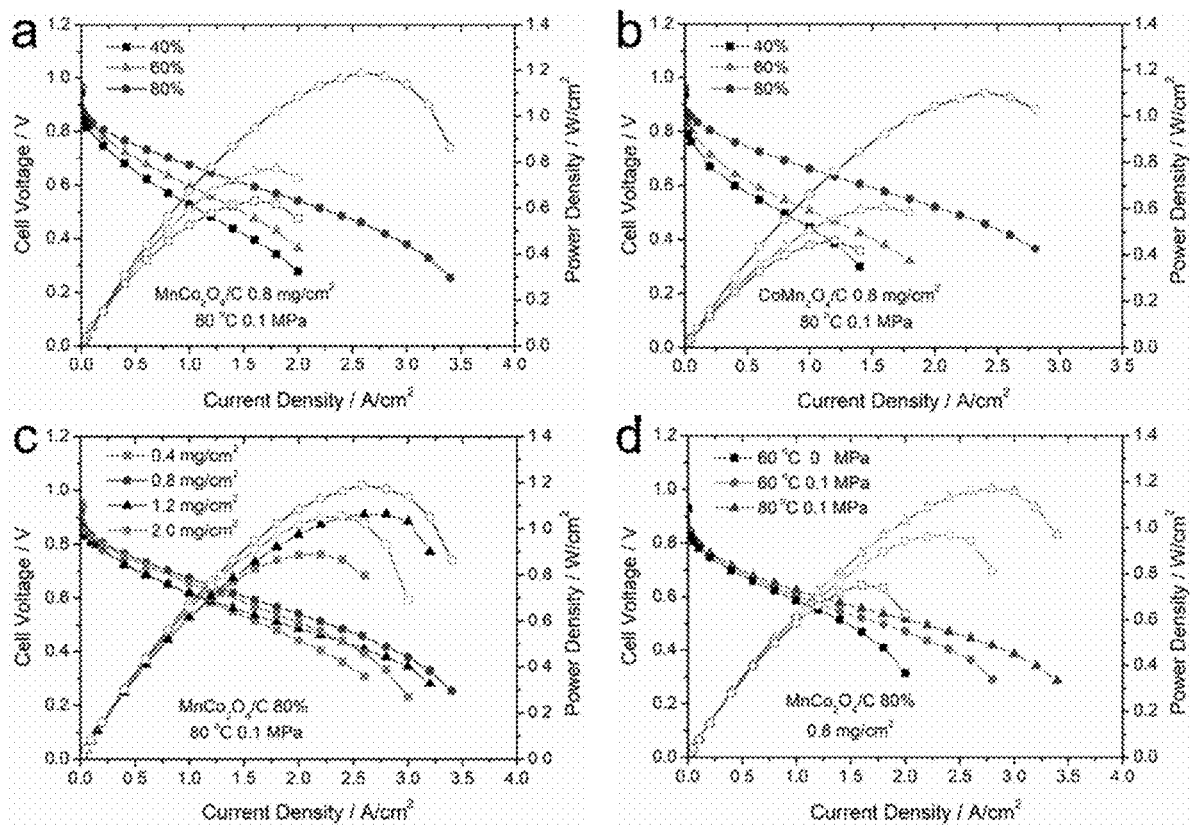
FIG. 7 shows MEA performance of AEMFC embodiments using Co—Mn spinel oxides in the cathode, 60 wt. % PtRu/C (0.4 $mg_{PtRu}$/cm²) in the anode, and QAPTT as the alkaline membrane and ionomer binder. Fully humidified $H_2$ and $O_2$ gas were fed into the cell at a flow rate of 1000 mL/min. (7a-b) MEA performance of $MnCo_2O_4$/C and $CoMn_2O_4$/C with 40, 60, and 80 wt. % metal oxide loadings on HSC KB. The catalyst loadings in the cathode were all controlled to be 0.8 $mg_{metal\ oxide}$/cm² and the cell operating conditions were 80° C. with 0.1 MPa back-pressure. (7c) MEA performance of $MnCo_2O_4$/C (80 wt. %) with a series of catalyst loadings from 0.4 to 2.0 mg/cm² in the cathode with operating conditions of 80° C. and 0.1 MPa back-pressure. (7d) MEA performance of $MnCo_2O_4$ at different operating conditions (60 or 80° C.; with or without 0.1 MPa back-pressure). Metal oxide loadings on carbon were controlled to be 80 wt. % and catalyst loadings in the cathode were 0.8 $mg_{metal\ oxide}$/cm².

The $H_2$—$O_2$ cell performance was tested using the quaternary ammonium poly(N-methyl-piperidine-co-p-terphenyl) (QAPPT, IEC=2.58 mmol/g), which was developed for stable cell operation at 80° C. as the alkaline membrane (thickness of 30±5 μm) and ionomer binder in MEA measurements. 60 wt. % PtRu/C (0.4 $mg_{PtRu}$/cm$^2$) was used as the anode catalyst and Mn—Co spinel oxides as the cathode catalyst. The cell was operated at 60 or 80° C. with or without 0.1 MPa back-pressure. Both $CoMn_2O_4$/C and $MnCo_2O_4$ exhibited an impressive enhancement in peak power density (PPD) at 80° C. with 0.1 MPa back-pressure, as the metal oxide loading increased from 40 to 60 and 80 wt. % (FIGS. 7a-b). The PPD of $CoMn_2O_4$/C showed a two-fold enhancement from 0.63 W/cm$^2$ at 40 wt. % to 1.2 W/cm$^2$ at 80 wt. % while the PPD of $CoMn_2O_4$/C was also boosted from 0.46 W/cm$^2$ at 40 wt. % to 1.1 W/cm$^2$ at 80 wt. % (FIGS. 7a-b). Detailed data are listed below in Tables I and II.

TABLE I

Peak powder density summary of $MnCo_2O_4$/C with different metal oxide loading on carbon and different catalyst loadings in the cathode under different operating conditions

| 80% $MnCo_2O_4$/C | 60° C. 0 MPa | 60° C. 0.1 MPa | 80° C. 0.1 MPa |
|---|---|---|---|
| 0.4 $mg_{metal\ oxide}$/cm$^2$ | 700 | 840 | 890 |
| 0.8 $mg_{metal\ oxide}$/cm$^2$ | 920 | 1040 | 1190 |
| 1.2 $mg_{metal\ oxide}$/cm$^2$ | 560 | 780 | 1080 |
| 2.0 $mg_{metal\ oxide}$/cm$^2$ | 970 | 970 | 1050 |
| 60% $MnCo_2O_4$/C 0.8 $mg_{metal\ oxide}$/cm$^2$ | 540 | 610 | 780 |
| 40% $MnCo_2O_4$/C 0.8 $mg_{metal\ oxide}$/cm$^2$ | 470 | N/A | 630 |

TABLE II

Peak powder density summary of $CoMn_2O_4$/C with different metal oxide loading on carbon and different catalyst loadings in the cathode under different operating conditions

| 80% $CoMn_2O_4$/C | 60° C. 0 MPa | 60° C. 0.1 MPa | 80° C. 0.1 MPa |
|---|---|---|---|
| 0.8 $mg_{metal\ oxide}$/cm$^2$ | 780 | 960 | 1100 |
| 2.0 $mg_{metal\ oxide}$/cm$^2$ | 700 | 840 | 900 |
| 60% $CoMn_2O_4$/C 0.8 $mg_{metal\ oxide}$/cm$^2$ | 420 | 490 | 580 |
| 40% $CoMn_2O_4$/C 0.8 $mg_{metal\ oxide}$/cm$^2$ | 340 | N/A | 460 |

Figure 8:
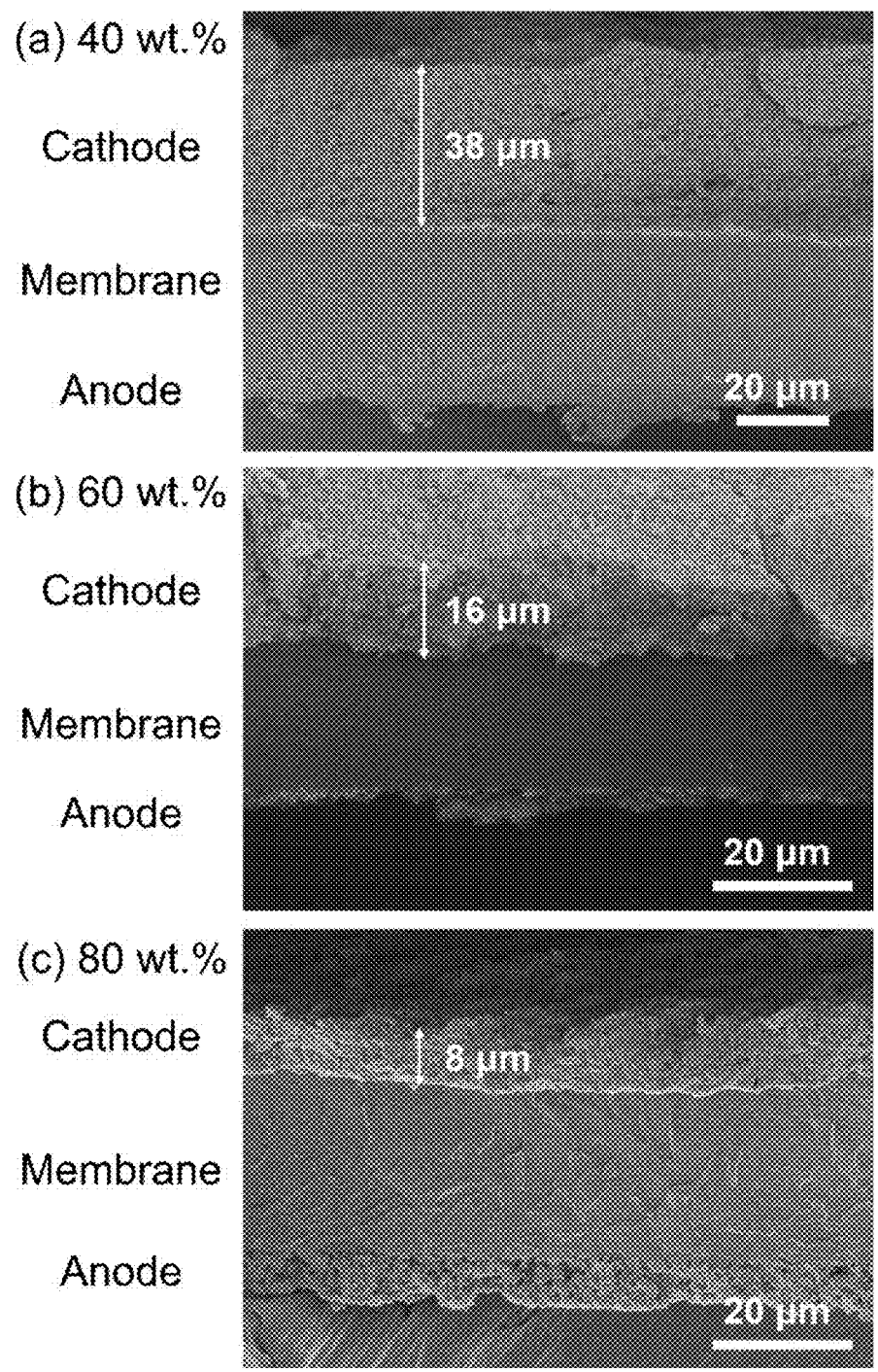
FIG. 8 depicts cross-sectioned SEM images of the catalyst coated membrane (CCM) with metal oxide loadings of 40, 60 and 80 wt. % (8a-c) with a fixed catalyst loading of 0.8 $mg_{metal\ oxide}$/cm² in the MEA. The cathode catalyst layer decreased from 40 μm at 40 wt. % to 16 μm at 60 wt. % and 8 μm at 80 wt. % as the carbon loading decreased from 1.2 to 0.53 and 0.20 mg/cm², respectively. The thickness of the alkaline membrane in the middle is 30±5 μm and the thickness of the anode (PtRu/C, 60 wt. % with a loading 0.4 $mg_{PtRu}$/cm²) is around 5 μm. The as-prepared CCM was assembled in a fuel cell device and later taken out for cross-section SEM imaging, so that the thickness of the catalyst layer can represent the situation inside a fuel cell more accurately since the assembly process can compress the CCM.

It is believed that the performance of >1 W/cm$^2$ at a current density of >2.5 A/cm$^2$ represents the highest PPD performance ever achieved by non-precious ORR electrocatalysts in APEFCs. This significant performance enhancement was ascribed to the superior mass transport efficiency at higher metal oxide loadings. The catalyst loadings in MEA were fixed at 0.8 $mg_{metal\ oxide}$/cm$^2$, so that the carbon loadings in MEA were 1.2 mg/cm$^2$, 0.53 mg/cm$^2$ and 0.20 mg/cm$^2$ at metal oxide loadings of 40, 60 and 80 wt. %, respectively. SEM images of the cross section showed that the thickness of the catalyst layer decreased from 38 at 40 wt. % to 16 at 60 wt. % and finally to 8 μm at 80 wt. % (FIG. 8). A thinner catalyst layer of <10 μm at 80 wt. % is more efficient for $O_2$, $H_2O$ and $OH^-$ transport, which could more effectively supply reactants specially for high current densities (>2 A/cm$^2$), leading to a higher PPD performance.

Figure 9:
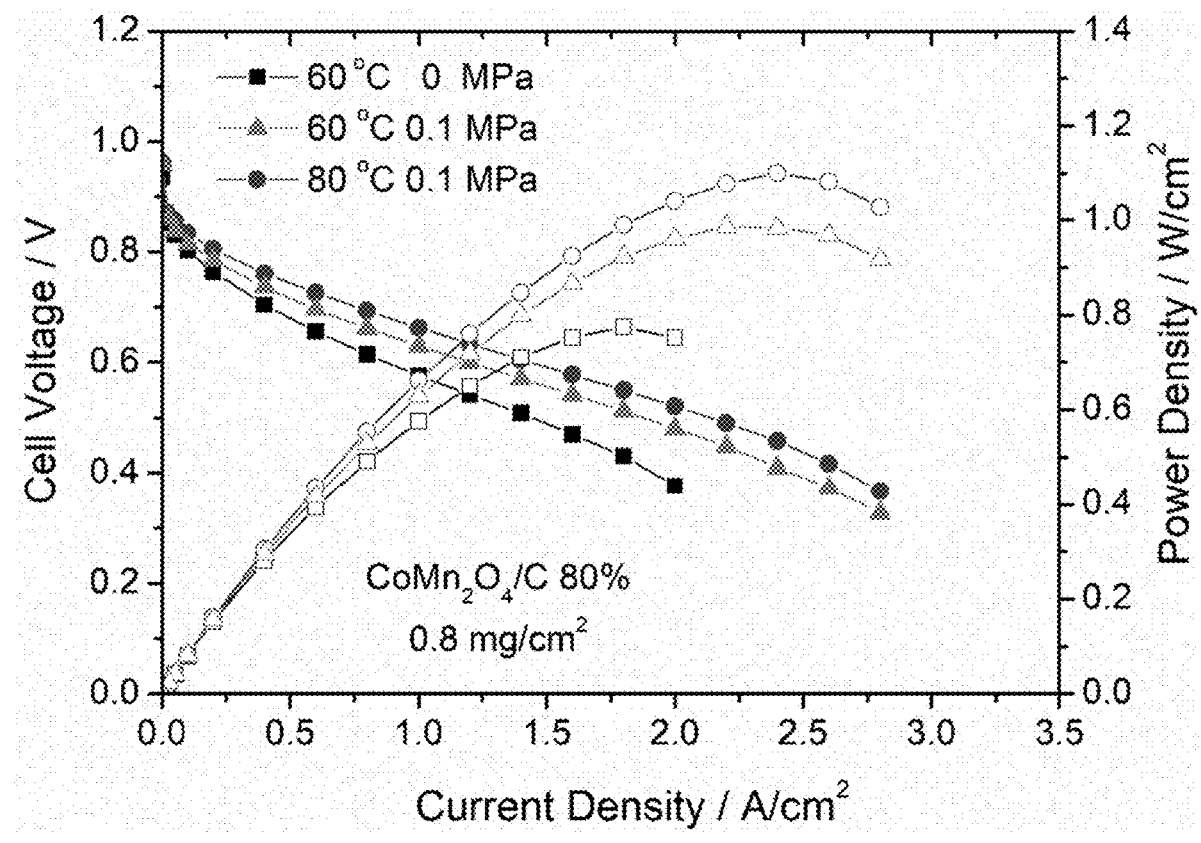
FIG. 9 is a chart depicting MEA performance of $CoMn_2O_4$ at different operating conditions (60 and 80° C.; with or without 0.1 MPa back-pressure). Metal oxide loadings on carbon were controlled to be 80 wt. % and catalyst loadings in the cathode were 0.8 $mg_{metal\ oxide}$/cm².

The impact of the catalyst loading in the cathode was investigated from 0.4 to 2.0 $mg_{metal\ oxide}$/cm$^2$ (FIG. 7c). The cell performance improved significantly, from 0.89 to 1.2 W/cm$^2$ when the catalyst loadings increased from 0.4 to 0.8 mg/cm$^2$, which was attributed to the increased amount of catalyst active sites. However, further increases in the catalyst loading from 0.8 to 2.0 mg/cm$^2$, resulted in a noticeable decrease in the PPD from 1.2 to 1.0 W/cm$^2$. With catalyst loadings higher than 0.8 cm$^2$, the mass transport limitation became dominant, relative to the increase in the amount of active sites. Different cell operating conditions were also systematically studied, including cell temperatures and operation with or without back-pressure (FIG. 7d). The MEA with $MnCo_2O_4$/C (80 wt. %) exhibited a PPD enhancement from 0.92 W/cm$^2$ to 1.0 W/cm$^2$ by applying a 0.1 MPa back-pressure to both $H_2$ and $O_2$ and a further PPD increase from 1.0 to 1.2 W/cm$^2$ when the temperature increased from 60 to 80° C. with a 0.1 MPa back-pressure. $CoMn_2O_4$ showed a similar PPD increase from 0.78 W/cm$^2$ at 60° C. with no back-pressure to 1.1 W/cm$^2$ at 80° C. with back-pressure (FIG. 9). This suggests that Co—Mn spinel oxides have an excellent temperature-tolerant performance at both 60 and 80° C., which is critical to maintain the high energy efficiency of fuel cells. Few precious or non-precious ORR electrocatalysts can work at such a high temperature of 80° C. at a PPD above 1 W/cm$^2$. This high performance was attributed to the combination of the high-loading active Co—Mn oxide electrocatalysts and stable QAPPT membrane/ionomers.

Figure 10:
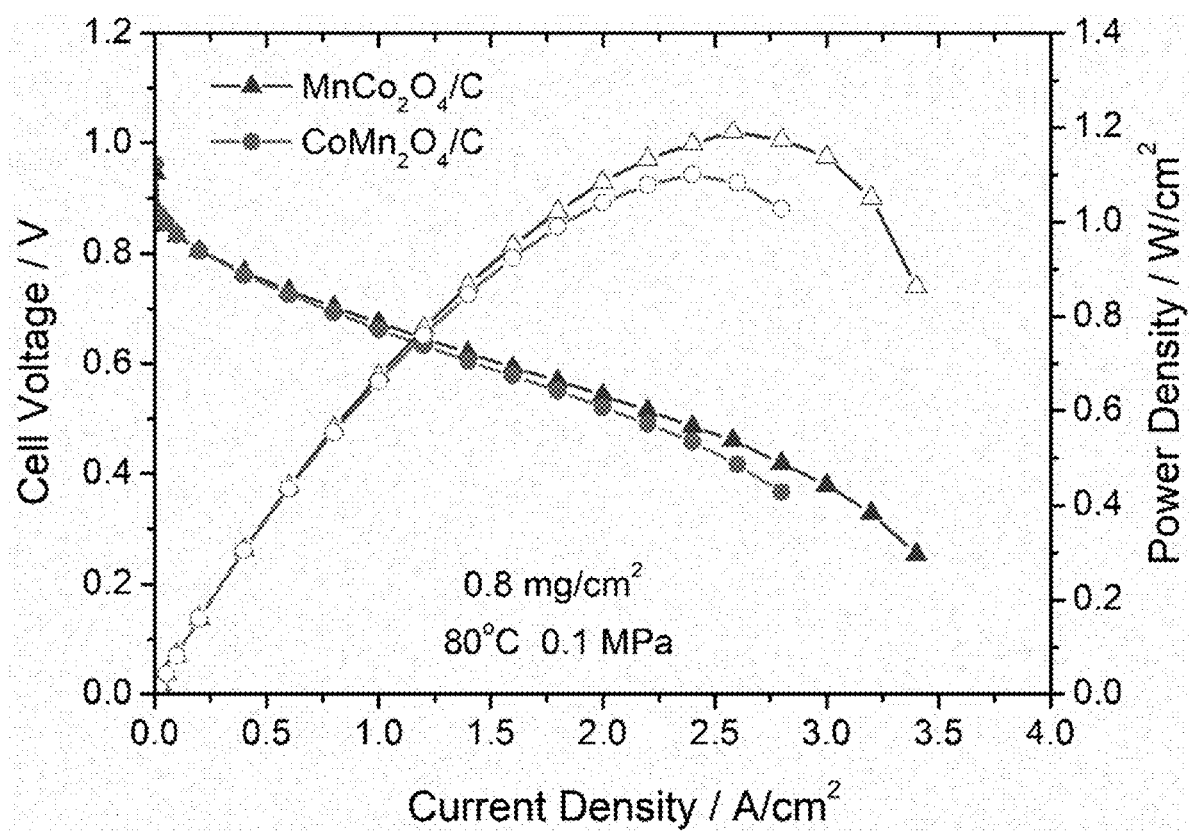
FIG. 10 is a chart comparing MEA performance using $MnCo_2O_4$/C and $CoMn_2O_4$ in the cathode. Metal oxide loadings on carbon were controlled to be 80 wt. % and catalyst loadings in the cathode were 0.8 $mg_{metal\ oxide}$/cm². Cells were operated at 80° C. with 0.1 MPa back-pressure.

In summary, embodiments of APEFCs with a record peak power density of over 1 W/cm$^2$ performance were achieved for both non-precious $MnCo_2O_4$/C (1.2 W/cm$^{-2}$ at 2.6 A/cm$^{-2}$) and $CoMn_2O_4$/C (1.1 W/cm$^2$ at 2.4 A/cm$^{-2}$) with a high metal oxide loading of 80 wt. %. at 80° C. with 0.1 MPa back-pressure (FIG. 10). This work suggests that MEA performance of Co—Mn spinel oxides is generally high even as the Co mole fraction of the cations varies from 2/3 to 1/3 from $MnCo_2O_4$/C to $CoMn_2O_4$/C. Consequently, even when Mn—Co oxide nanoparticles have variations in Mn and Co contents after large-scale synthesis, it will be less challenging to achieve the desired performance in practical fuel cell applications.

Comparative Study: Synergistic Mn—Co Catalyst Outperforms Pt on High-Rate Oxygen Reduction for Alkaline Polymer Electrolyte Fuel Cells.

The screening of fuel-cell electrocatalysts is generally carried out using rotating disk electrode (RDE) voltammetry. However, the RDE experimental conditions are distinctly different from those in a polymer electrolyte fuel cell, where the electrode is fed with humidified gas, and the catalyst surface is under a humid atmosphere rather than in contact with an aqueous solution", as is the case under RDE conditions. Thus, well-performing electrocatalysts in RDE tests often exhibit poor performance under fuel-cell operation. Moreover, the Mn—Co spinel catalyst (MCS) discussed herein exhibited moderate activity in RDE tests, but surprising and unexpectedly exhibited outstanding APEFC performance.

Figure 11:
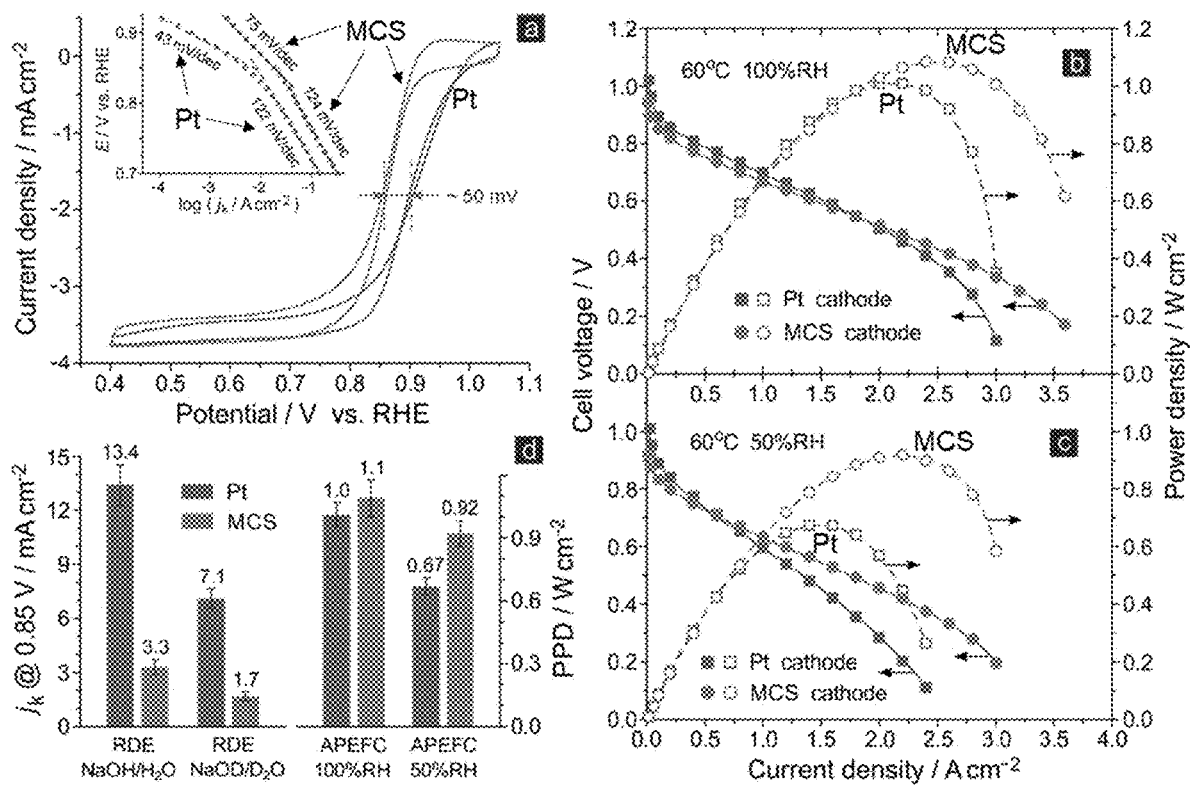
FIG. 11 compares performance of the Mn—Co spinel (MCS) catalyst towards the oxygen reduction reaction (ORR), relative to a commercial Pt catalyst.

FIG. 11a presents typical RDE profiles for the ORR catalyzed by Pt and MCS in 1.0 M KOH solution. A negative shift of 50 mV in the half-wave potential clearly indicates that the ORR occurs at a lower rate on MCS than on Pt, and this trend does not change with potential as evidenced in the Tafel plots (inset to FIG. 11a). Such an observation would usually lead to the conclusion that the MCS would not be a good choice as ORR electrocatalyst for APEFCs. However, the fuel cell tests tell a different, and most unexpected, story (FIG. 11b). An APEFC with a Pt—Ru anode and a Pt cathode, exhibiting a peak power density (PPD) of 1 W/cm², is a benchmark of current APEFC research. Upon replacing the Pt cathode with embodiments of the inventive cathode, the cell performance underwent a slight loss at low current densities, but, as the current density increased, it kept increasing in a steady fashion, reaching a higher PPD of 1.1 W/cm², a performance metric never previously achieved in APEFCs with a non-precious metal cathode catalyst. Embodiments of the MCS cathode can even sustain a current density of 3.5 A/cm², pointing to their inherently high activity.

Figure 12:
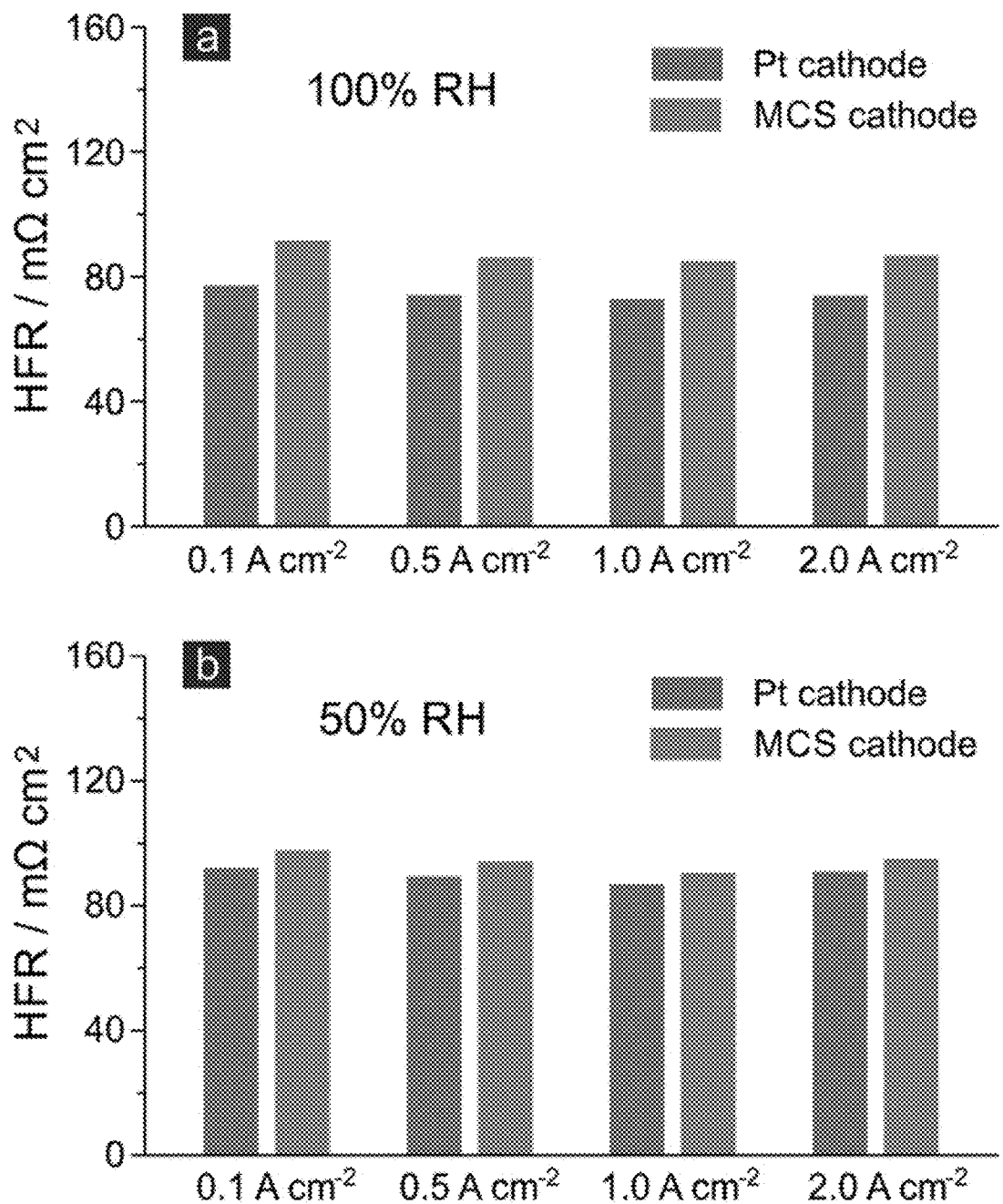
FIG. 12 shows high-frequency resistance (HFR) of APEFC single cells operated at different current densities and under different RH of the reactant gases. (a) 100% RH; (b) 50% RH.
Figure 13:
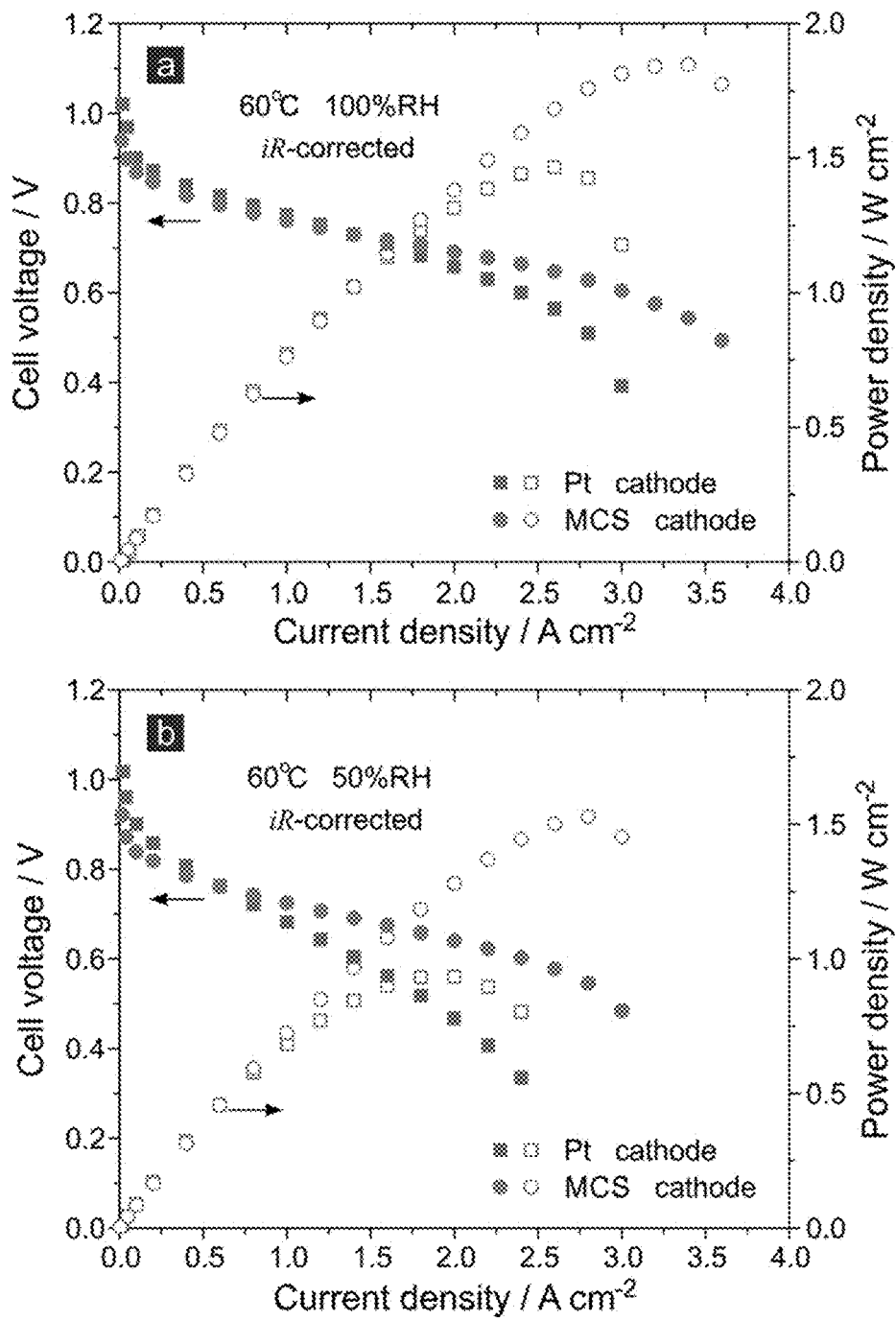
FIG. 13 is a chart depicting iR corrected APEFC cell performance.

Moreover, the MCS cathode dramatically outperforms the Pt cathode at low relative humidity (RH) over a wider range of current densities. As illustrated in FIG. 11c, when the humidity was lowered to 50% RH, a significant drop in cell performance was observed for the Pt cathode, with the PPD decreasing by one third to 0.67 W/cm². However, for the MCS cathode, the PPD remained virtually unchanged at 0.92 W/cm². The ability to work at low RH is a unique advantage for APEFC cathodes, where water (which is a reactant) is often depleted, particularly when the cell is operated at high current densities[19]. It should be noted that the Pt cathode has been well optimized to reach its maximum performance, the observed superiority of the MCS cathode, at high current densities and low humidity, is not due to a structural effect of the electrodes. In fact, the Pt cathode is thinner in the catalyst layer, which possesses lower electrical resistance than the MCS cathode (FIGS. 12-13). Since the operation conditions (gas backpressure, flow rate, etc.) are the same for both electrodes, the mass transport should not be particular to the thinner Pt cathode. It is believed that the obvious difference in the water/humidity dependence of the cathode performance is related to a certain catalyst-water interaction.

FIG. 11d summarizes the activity comparison between Pt and MCS under different experimental conditions in RDE and fuel-cell tests. While Pt is superior, over the MCS, under water-rich conditions, it becomes inferior at low water content. This suggests the presence of an effect, on the ORR catalytic activity, that is sensitive to the water content and works oppositely on Pt and MCS. In APEFCs, $H_2O$ is not only necessary for ionic conduction, but is also a reactant in the ORR (Eq. 1).

$$O_2 + 2H_2O + 4e^- = 4OH^-$$ (1)

Figure 14:
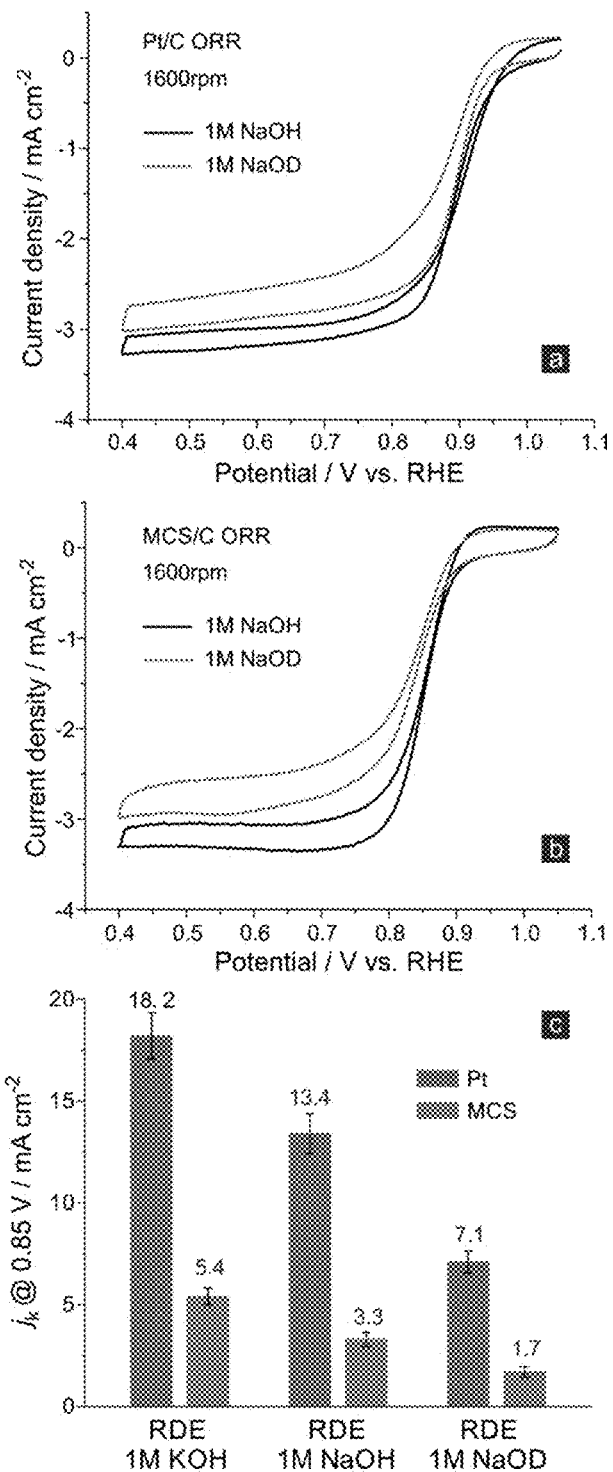
FIG. 14 depicts results from isotopic labelling experiments.

Proton transfer processes in this reaction are as crucial as the electron transfer events themselves, as evidenced (via H/D isotope effects) by the significant diminution of the kinetics of the ORR in $NaOD/D_2O$ solution (FIG. 11d and FIG. 14). Thus, the ORR will be highly sensitive to the amount, and state, of $H_2O$ just above the catalyst surface, especially when $H_2O$ is a minority species in the gaseous phase. The high catalytic activity of MCS toward the ORR at low $H_2O$ content suggests the presence of a special affinity for $H_2O$, in addition to the appropriate interactions with $O_2$.

Figure 15:
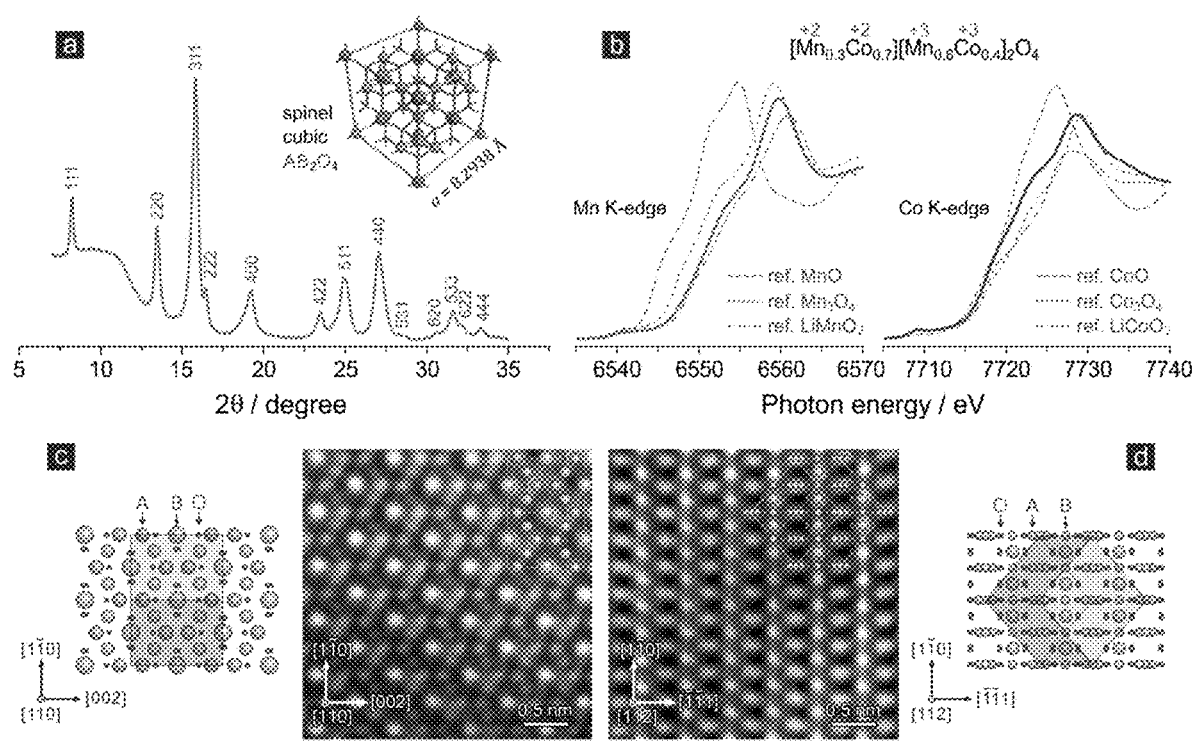
FIG. 15 shows structural characterization of an MCS catalyst embodiment exhibiting optimal ORR performance.

In an effort to unveil the origin of these effects, in-depth characterization of the structure and surface properties was carried out. Synchrotron X-ray diffraction (XRD, FIG. 15a) clearly indicates the presence of the cubic spinel structure ($AB_2O_4$) with a lattice constant a=8.2938 Å.

The formal valence of Mn and Co in the MCS sample exhibiting optimal ORR performance (nominally $Mn_{1.5}Co_{1.5}O_4$) were analyzed using X-ray absorption near edge structure (XANES, FIG. 2b), which yielded values of +2.76 and +2.56, respectively. The stoichiometry of the spinel ($AB_2O_4$) was thus determined to be $[Mn_{0.3}Co_{0.7}][Mn_{0.6}Co_{0.4}]_2O_4$, indicating that while Co is distributed almost uniformly at the tetrahedral (A) and octahedral (B) sites of the spinel lattice, Mn is enriched at the B site. The elemental ratio of Mn/Co is 3/2 at the catalytically active B site.

Scanning transmission electron microscopy (STEM) observations indicated that the MCS particles are irregularly-shaped nanocrystals (FIG. 16). The high-angle annular dark-field STEM images (HAADF-STEM, FIGS. 15c & 15d), taken on the [110] and [112] zone axes, provide atomic views of the arrangement of metal ions inside the MCS lattice. The high-contrast patterns match well the lattice model reconstructed based on the above-determined stoichiometry. In addition, the atomic-scale elemental mapping, using energy-dispersive X-ray spectroscopy (not pictured), also confirms the enrichment of Mn at the B sites.

In an attempt to distinguish the functionality of the Mn sites and Co sites on the spinel surface, MCS samples with Mn-segregated and Co-segregated surfaces were deliberately prepared, denoted as Mn-MCS and Co-MCS, respectively. The success in controlling surface segregation was ascertained by elemental mapping using electron energy loss spectroscopy (EELS, insets of FIG. 17a). Samples were then characterized with X-ray photoelectron spectroscopy (XPS) to identify the oxygen-containing surface species (FIG. 17a). In addition to $O^{2-}$ that constitutes the spinel, $OH_{ads}$ and $H_2O_{ads}$ were identified by their distinct chemical shifts. While Mn segregation resulted in an enhancement in the $O^{2-}$ component and a diminution of $H_2O_{ads}$, Co segregation caused a reversal effect with a clear increase in the $H_2O_{ads}$ component. These results suggest that the actual MCS surface consists mainly of Mn—OH/Mn—O and Co—OH/Co—$OH_2$, in agreement with the zeta-potential analysis in solutions of varying pH. As shown in FIG. 17b, the potential of zero charge (PZC) of MCS appears at pH=5.5, and shifts to pH=8.5 upon Co segregation, and to pH=3.3 upon Mn segregation. These observations suggest that the Co sites interact weakly with O, and tend to be positively charged, likely as Co—$OH_2^{\delta+}$, while the Mn sites have a strong affinity for O, and tend to be negatively charged, likely as Mn—$O^{\delta-}$.

The above experimental observations of the surface character of the MCS are in qualitative agreement with density functional theory (DFT) calculations (FIG. 17c). The Mn sites on MCS are highly active for binding both $O_2$ and $H_2O$, but the Mn—$O_2$ interaction is stronger than the Mn—$OH_2$ interaction, suggesting that the Mn sites prefer to bind $O_2$ over $H_2O$ when the MCS is exposed to humid air. In contrast, the Co sites have a notable affinity for $H_2O$ but appear not to bind $O_2$ by itself (given that $O_2$ can adsorb at the bridge sites between Mn and Co atoms). Hence, when the MCS cathode is exposed to humid $O_2$, the Mn sites and Co sites on the surface bind different adsorbates, preferentially yielding Mn—$O_2$ and Co—$OH_2$, respectively.

The DFT calculations can also provide an assessment of the capability of breaking the O—O bond at a catalytic site. Specifically, the adsorption energy of an O atom is calculated relative to half the energy of $O_2$, such that negative values designate a thermodynamically spontaneous dissociation of $O_2$. As presented in FIG. 17c, the dissociation of $O_2$ is energetically highly favorable on the Mn site, but disfavored (albeit slightly) on the Co site. One can thus conclude that the MCS possesses a synergistic surface for ORR catalysis, with the Mn sites binding and cleaving $O_2$, and the Co sites enriching and activating $H_2O$, so as to facilitate the proton-coupled electron transfer processes of oxygen reduction.

The proposed synergistic mechanism of the MCS-catalyzed ORR is illustrated, stepwise, in FIG. 18a. Assuming that Mn—OH and Co—OH represent the initial states, the $O_2$ is preferentially bound to the Mn site to yield Mn—$O_2$, along with a 1e$^-$ reduction to produce OH$^-$. $H_2O$ is preferentially bound to the Co site, as Co—$OH_2$, also with a 1e$^-$ reduction to generate OH$^-$. A surface proton transfer (reaction I) can then occur from the Co—$OH_2$ to the proximate Mn—$O_2$, leading to a regenerated Co—OH and a Mn—OOH species that is followed by a 1e$^-$ reduction to produce Mn=O and OH$^-$. The Mn=O can take the second proton, transferred from Co—$OH_2$, to regenerate the Mn—OH (reaction II). The extraordinary feature of this mechanism includes the proton mediation by the turnover of Co—OH/Co—$OH_2$ and the surface proton transfer between the proximate Co and Mn sites. On the one hand, based on DFT calculations, the O—H bond energy decreases from 5.14 eV to 3.42 eV when the $H_2O$ is bound to the Co site (upper-right inset of FIG. 18a). On the other hand, the energy barriers for reaction I and II are small (central inset of FIG. 18A). It is believed that these energetic features are fundamental to the $H_2O$ activation and proton-transferred reduction of $O_2$ on the MCS surface.

To ascertain the involvement of surface $H_2O$ in the MCS-catalyzed ORR, in-situ attenuated total reflection Fourier transform infrared spectroscopy (ATR-FTIR) was employed to detect the subtle changes in the $H_2O$ vibrations on Pt and MCS surfaces under electrochemical conditions (FIG. 18b). The $H_2O$ bending vibration, δ(HOH), turns out to be at higher wavenumbers on Pt than on MCS, indicating that the Pt—$H_2O$ interaction is weaker than the MCS-$H_2O$ interaction. Even more compelling evidence for the strong adsorption of $H_2O$ on the MCS surface is provided by the Stark effect, namely, a significant potential-dependent shift in the δ(HOH) wavenumber of 25 cm$^{-1}$/V. In contrast, such a Stark effect is negligible on a Pt surface. These experimental observations are consistent with the DFT calculations (FIG. 17c) that show that the adsorption energy of $H_2O$ on Pt (111) is only one third of that on MCS (100).

Additional valuable information was provided by in-situ ATR-FTIR experiments, showing that the δ(HOH) wavenumber decreased on both Pt and MCS when the atmosphere was switched from Ar to $O_2$ (FIG. 18b). This can only be ascribed to the additional interaction between the surface $H_2O$ and the surface oxygen species, providing unambiguous evidence for the involvement of surface $H_2O$ in the ORR. Moreover, the δ(HOH) Stark effect remained unchanged on MCS during the ORR, indicating that the surface $H_2O$ has not been repelled by the co-adsorption of $O_2$; whereas the originally weak Stark effect of δ(HOH) on Pt could barely be observed during the ORR, suggesting that the $H_2O$ is likely to be further away from the Pt surface when covered by oxygen species. The identification of the different functionalities of the Mn sites and Co sites, and the direct observation of the involvement of surface $H_2O$ in the MCS-catalyzed ORR, provide strong support for the synergistic mechanism (FIG. 18a).

The above computational and experimental observations clearly establish the unexpected and superior activity of MCS over Pt for the ORR under conditions of high current density and low humidity. The lower ORR activity of MCS in RDE tests is also understandable. In $O_2$ saturated KOH solutions, the molar ratio of $H_2O/O_2$ is over 10$^4$, so that the hydrophilic MCS surface is dominated by $H_2O$, despite the oxophilicity of the Mn sites. Molecular dynamics (MD) simulations (FIG. 18c) show that liquid water can wet the MCS surface with a proximity of 0.23 nm, in comparison to 0.3 nm on a Pt surface. Thus, there is more space for $O_2$ adsorption on a Pt surface than on an MCS surface under water-flooding conditions.

Although MCS-like materials were used as ORR catalysts in the literature, the cell performance has never reached such a high level as reported in this work, and the mechanistic understanding has been vague. The data presented herein represent not only the discovery of a practical, high-performance non-precious metal catalyst for APEFCs, but also reveal a new strategy for the ORR catalyst design. In addition to the electronic effects that have often been used and/or invoked to tune the reactivity of solid surfaces toward $O_2$, designing synergistic surfaces that can activate $H_2O$ and facilitate proton transfer processes is also pivotal for ORR catalysts, in particular for metal oxides working in alkaline media, where both $O_2$ and $H_2O$ are reactants.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a composition or article that "comprises", "has", "includes" or "contains" one or more features possesses those one or more features, but is not limited to possessing only those one or more features.

As used herein, the terms "comprising," "has," "including," "containing," and other grammatical variants thereof encompass the terms "consisting of" and "consisting essentially of."

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

The invention claimed is:

1. An apparatus comprising an anode, a cathode, and a charge-passing material between the anode and the cathode, the apparatus being an anion-exchange membrane fuel cell (AEMFC) or a membrane electrode assembly (MEA), wherein the cathode comprises a metal oxide/carbon catalyst composition comprising:
   40 to 95 wt % metal oxide, said metal oxide being porous Mn—Co spinel oxide nanoparticles of the formula $Mn_xCo_{3-x}O_4$, said nanoparticles having an octahedral morphology, an average particle size of 5-100 nm, and average pore sizes of 1-5 nm, and wherein x is the atomic fraction of manganese (Mn), 3-x is the atomic fraction of cobalt (Co), and 0<x<3; and
   a carbon substrate comprising at least 96 atomic % carbon,
wherein the metal oxide nanoparticles are supported on the carbon substrate, and wherein said apparatus exhibits a peak power density of at least 0.8 W/cm² at a current density of 2.0 A/cm².

2. The apparatus according to claim 1, wherein the metal oxide/carbon catalyst composition comprises 40 to 90 wt % of the metal oxide nanoparticles.

3. The apparatus according to claim 1, wherein the metal oxide/carbon catalyst composition comprises 50 to 85 wt % of the metal oxide nanoparticles.

4. The apparatus according to claim 1, wherein the metal oxide/carbon catalyst composition comprises 60 to 80 wt % of the metal oxide nanoparticles.

5. The apparatus according to claim 1, wherein the metal oxide is present as a single phase.

6. The apparatus according to claim 1, wherein the metal oxide is selected from $MnCo_2O_4$, $CoMn_2O_4$, and $Mn_{1.5}Co_{1.5}O_4$.

7. The apparatus according to claim 6, wherein the metal oxide is $MnCo_2O_4$.

8. The apparatus according to claim 7, wherein the $MnCo_2O_4$ has a single-phase cubic spinel structure.

9. The apparatus according to claim 6, wherein the metal oxide is $CoMn_2O_4$.

10. The apparatus according to claim 9, wherein the $CoMn_2O_4$ has a single-phase tetragonal spinel structure.

11. The apparatus according to claim 1, wherein the carbon substrate is not doped.

12. The apparatus according to claim 1, wherein the carbon substrate is selected from graphite, amorphous carbon, hard carbon, soft carbon, acetylene black, mesocarbon microbeads (MCMB), carbon black, mesoporous carbon, porous carbon matrix, carbon nanotubes, carbon nanofibers, and graphene.

13. The apparatus according to claim 1, wherein the nanoparticles have an average particle size of 10 to 100 nm.

14. The apparatus according to claim 1, wherein the apparatus is an AEMFC.

15. The apparatus according to claim 1, wherein the apparatus is an MEA.

16. The apparatus according to claim 1, wherein the cathode has a metal oxide loading of at least 0.6 $mg_{metal\ oxide}$/cm².

17. The apparatus according to claim 16, wherein, when operating at 80° C. with 0.1 MPa back-pressure, the apparatus exhibits a peak power density of at least 1.0 W/cm² at a current density of 2.0 A/cm².

18. The apparatus according to claim 17, wherein the apparatus is an MEA, and wherein the MEA comprises a platinum-based (e.g., PtRu/C and Pt/C) anode and an alkaline polymer membrane.

19. The apparatus according to claim 1, wherein said metal oxide/carbon catalyst composition is present in a catalyst layer having a thickness of 5 to 40 μm.

20. An electrocatalytic process comprising providing or operating an apparatus according to claim 1, wherein said process comprises use of the metal oxide/carbon catalyst in the cathode to perform an oxygen reduction reaction (ORR).

* * * * *